(12) United States Patent
Yoshimi

(10) Patent No.: US 11,172,082 B2
(45) Date of Patent: Nov. 9, 2021

(54) INFORMATION PROCESSING APPARATUS, INFORMATION PROCESSING SYSTEM, AND INFORMATION PROCESSING METHOD

(71) Applicant: Ricoh Company, Ltd., Tokyo (JP)

(72) Inventor: Shun Yoshimi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/584,030

(22) Filed: Sep. 26, 2019

(65) Prior Publication Data
US 2020/0177744 A1  Jun. 4, 2020

(30) Foreign Application Priority Data
Nov. 30, 2018  (JP) .............................. JP2018-226111

(51) Int. Cl.
*G06F 15/00* (2006.01)
*H04N 1/00* (2006.01)
*G06F 3/12* (2006.01)

(52) U.S. Cl.
CPC ....... *H04N 1/00403* (2013.01); *G06F 3/1205* (2013.01); *G06F 3/1258* (2013.01); *H04N 1/0048* (2013.01); *H04N 1/00477* (2013.01); *H04N 1/00488* (2013.01)

(58) Field of Classification Search
CPC ........... H04N 1/00403; H04N 1/00477; H04N 1/0048; H04N 1/00488; G06F 3/1205; G06F 3/1258

USPC ................................................ 358/0.15, 1.15
See application file for complete search history.

(56) References Cited

U.S. PATENT DOCUMENTS

| 2002/0013701 | A1* | 1/2002 | Oliver | G06F 3/16 704/231 |
| 2011/0054908 | A1* | 3/2011 | Matsuda | G10L 15/26 704/275 |
| 2013/0297320 | A1* | 11/2013 | Buser | B33Y 70/00 704/275 |
| 2018/0268817 | A1 | 9/2018 | Aono | |

FOREIGN PATENT DOCUMENTS

| JP | 2016-083740 | 5/2016 |
| JP | 2018-156060 | 10/2018 |

OTHER PUBLICATIONS

U.S. Appl. No. 16/351,629, filed Mar. 13, 2019, Yutaka Nakamura.

* cited by examiner

*Primary Examiner* — Mark R Milia
(74) *Attorney, Agent, or Firm* — Xsensus LLP

(57) ABSTRACT

An information processing apparatus includes circuitry that receives, via a communication network, a first user request input in voice to a terminal, and reflects the first user request in a type or setting of a job. When a second user request input in voice to the terminal after the first user request is received via the communication network during the reflection of the first user request, the circuitry displays, on a display, information of the type or setting of the job reflecting a previous user request preceding the second user request. The previous user request includes the first user request.

13 Claims, 14 Drawing Sheets

| printColor | |
|---|---|
| ☑ Define synonyms  ⓘ  ☐ Allow automated expansion | |
| auto_color | auto_color |
| monochrome | monochrome, black and white |
| color | color, full color |
| two_color | two color |
| single color | single color |
| red_and_black | red and black |

FIG. 10

| Add user expression |
|---|
| Please copy this with settings: two-color, double-sided, and 2 in 1. |
| Please copy document with settings: Tray 1, fitting, and double-sided. |
| Make two copies of this document in dark monochrome. |
| Make three copies with 4 in 1. |
| Execute copy with settings: color and auto tray. |
| Please copy this document at 80% from Tray 1. |
| Copy dark on one side. |
| Copy dark in black and white. |

Action

| copy |
|---|

| Entity | | ENTITY ⑦ | VALUE |
|---|---|---|---|
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

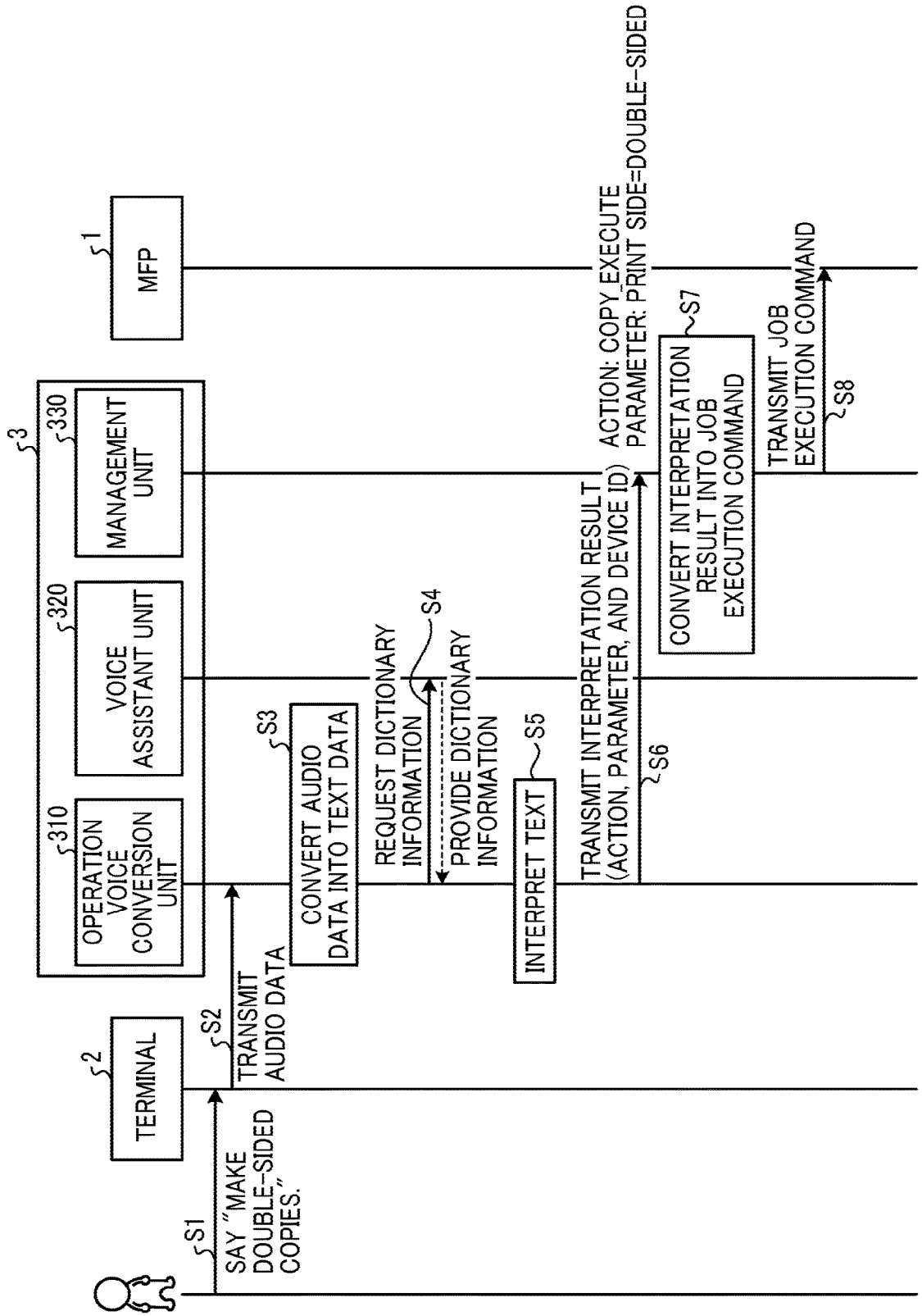

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2018-226111 filed on Nov. 30, 2018 in the Japan Patent Office, the entire disclosure of which is hereby incorporated by reference herein.

BACKGROUND

Technical Field

The present invention relates to an information processing apparatus, an information processing system, and an information processing method.

Description of the Related Art

There is a technique of transmitting an operation instruction from a terminal to a server and transmitting an operation signal from the server to an apparatus to operate the apparatus.

For example, there is a technique of transmitting audio data acquired by a mobile terminal to a server, converting the audio data into a control command with the server, and transmitting the control command from the server to an apparatus.

When there are multiple settings to be executed, however, a user issues multiple voice instructions. Further, if one of the instructions fails to be reflected in the apparatus, it is difficult for the user to understand which one of the instructions has been reflected in the apparatus.

SUMMARY

In one embodiment of this invention, there is provided an improved information processing apparatus that includes, for example, circuitry that receives, via a communication network, a first user request input in voice to a terminal, and reflects the first user request in a type or setting of a job. When a second user request input in voice to the terminal after the first user request is received via the communication network during the reflection of the first user request, the circuitry displays, on a display, information of the type or setting of the job reflecting a previous user request preceding the second user request. The previous user request includes the first user request.

In one embodiment of this invention, there is provided an improved information processing system that includes, for example, at least one server and at least one information processing apparatus connectable with the at least one server via a communication network. The at least one server includes first circuitry that acquires audio information of voice input to a terminal, and transmits a first user request to the at least one information processing apparatus based on the acquired audio information. The at least one information processing apparatus includes second circuitry that reflects the first user request in a type or setting of a job. When a second user request input in voice to the terminal after the first user request is received via the communication network during the reflection of the first user request, the second circuitry displays, on a display, information of the type or setting of the job reflecting a previous user request preceding the second user request. The previous user request includes the first user request.

In one embodiment of this invention, there is provided an improved information processing method that includes, for example: receiving, via a communication network, a first user request input in voice to a terminal; reflecting the first user request in a type or setting of a job; and when a second user request input in voice to the terminal after the first user request is received via the communication network during the reflection of the first user request, displaying, on a display, information of the type or setting of the job reflecting a previous user request preceding the second user request. The previous user request includes the first user request.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is a diagram illustrating examples of user utterance phrases, action name, and entity information of the embodiment;

FIG. 11 is a sequence diagram illustrating an example of a basic overall operation of the voice operation system of the embodiment to perform a voice input operation;

Figure 1:
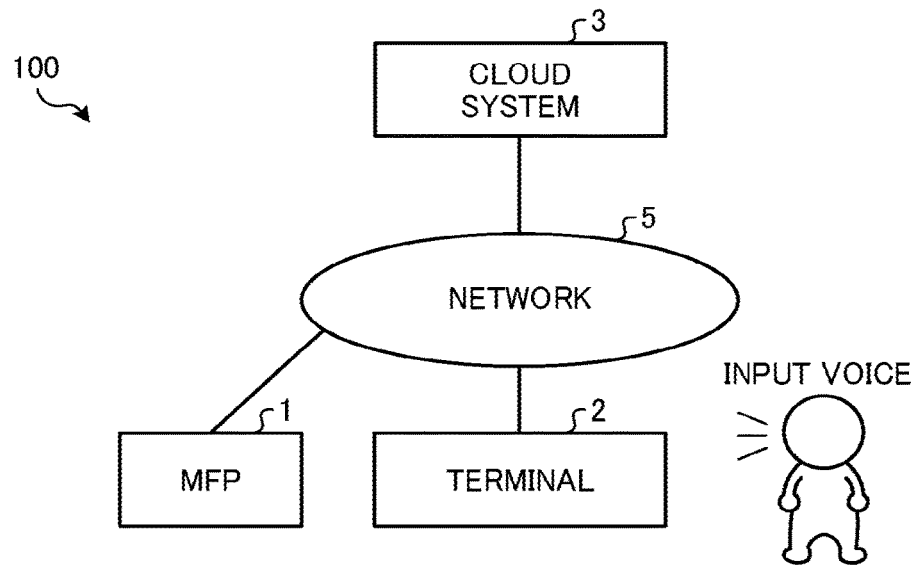
FIG. 1 is a diagram illustrating an example of general arrangement of a voice operation system of an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of an information processing apparatus, an information processing system, and an information processing method of the present invention will be described below with reference to the accompanying drawings. The following description will be given of an example of application to an information processing system that enables the operation of an information processing apparatus, such as an image processing apparatus or an electronic apparatus, via a terminal such as a smart speaker with a service provided by a cloud system.

A system configuration of an information processing system of an embodiment of the present invention will be described.

FIG. 1 is a diagram illustrating an example of general arrangement of the information processing system of the embodiment. FIG. 1 illustrates general arrangement of a voice operation system 100 as an example of the information processing system of the embodiment.

As illustrated in FIG. 1, the voice operation system 100 of the present example includes at least one multifunction peripheral (MFP) 1 (an example of second circuitry), at least one terminal 2, and a cloud system 3 (an example of first circuitry). The MFP 1 is an example of an information processing apparatus such as an image processing apparatus. The MFP 1 has a plurality of functions, such as a printer function, a scanner function, and a facsimile (FAX) function, for example. The information processing apparatus may be another apparatus other than the MFP. For example, the information processing apparatus may be an apparatus with one of the plurality of functions such as the printer function, the scanner function, and the FAX function. That is, the information processing apparatus may be a printer, a scanner, or a facsimile terminal, for example. Further, the information processing apparatus may be office equipment, such as an electronic whiteboard or a projector, or may be a different type of electronic apparatus other than the image processing apparatus. The terminal 2 is a device capable of transmitting an operation instruction to the MFP 1 via a network 5, such as a smart speaker, a smartphone, or a tablet terminal. The following description will be given on the assumption that the terminal 2 of the present example is a smart speaker.

A smart speaker receives voice input from a service user (hereinafter simply referred to as the user) requesting an operation of the MFP 1, and outputs audio feedback to the user as a response to the received operation. The smart speaker may include a touch display panel. In this case, a message to the user may be displayed on the touch display panel. In the present example described below, a smart speaker with a touch display panel is used as the terminal 2.

The at least one MFP 1 and the at least one terminal 2 are configured to be connectable to the network 5 to be connected to the cloud system 3 via the network 5. In the present example, in which the terminal 2 is a smart speaker, one smart speaker is placed near one MFP 1 to operate the MFP 1.

The cloud system 3 is implemented by one or more servers (i.e., cloud service apparatuses 3a in FIG. 4) residing on the network 5. Via the network 5, the cloud system 3 provides a service enabling the user to operate the MFP 1 via the terminal 2 (hereinafter referred to as the cloud service).

The network 5 is a communication network, such as a local area network (LAN) or the Internet, for example. Each of the MFP 1 and the terminal 2 includes a communication device. With the communication device, the MFP 1 and the terminal 2 are connected by wire or wirelessly to a network, such as an in-house LAN or a public network, to access the cloud system 3 via the Internet, for example.

As described in detail later, the terminal 2 performs data communication with the cloud system 3 (e.g., transmission and reception of audio data, text data, or image data for a user interface (UI)). The cloud system 3 analyzes the audio data (i.e., audio information) received from the terminal 2, and converts the audio data into text data. The cloud system 3 further interprets the intention of the user based on the text data and previously registered dictionary information. Further, when the instruction from the user is confirmed, for example, the cloud system 3 converts the user instruction into a job execution command (i.e., user request) in a format compatible with the MFP 1, and transmits the job execution command to the MFP 1. The MFP 1 executes the job execution command transmitted from the cloud system 3.

A hardware configuration of the MFP 1 will be described.

Figure 2:
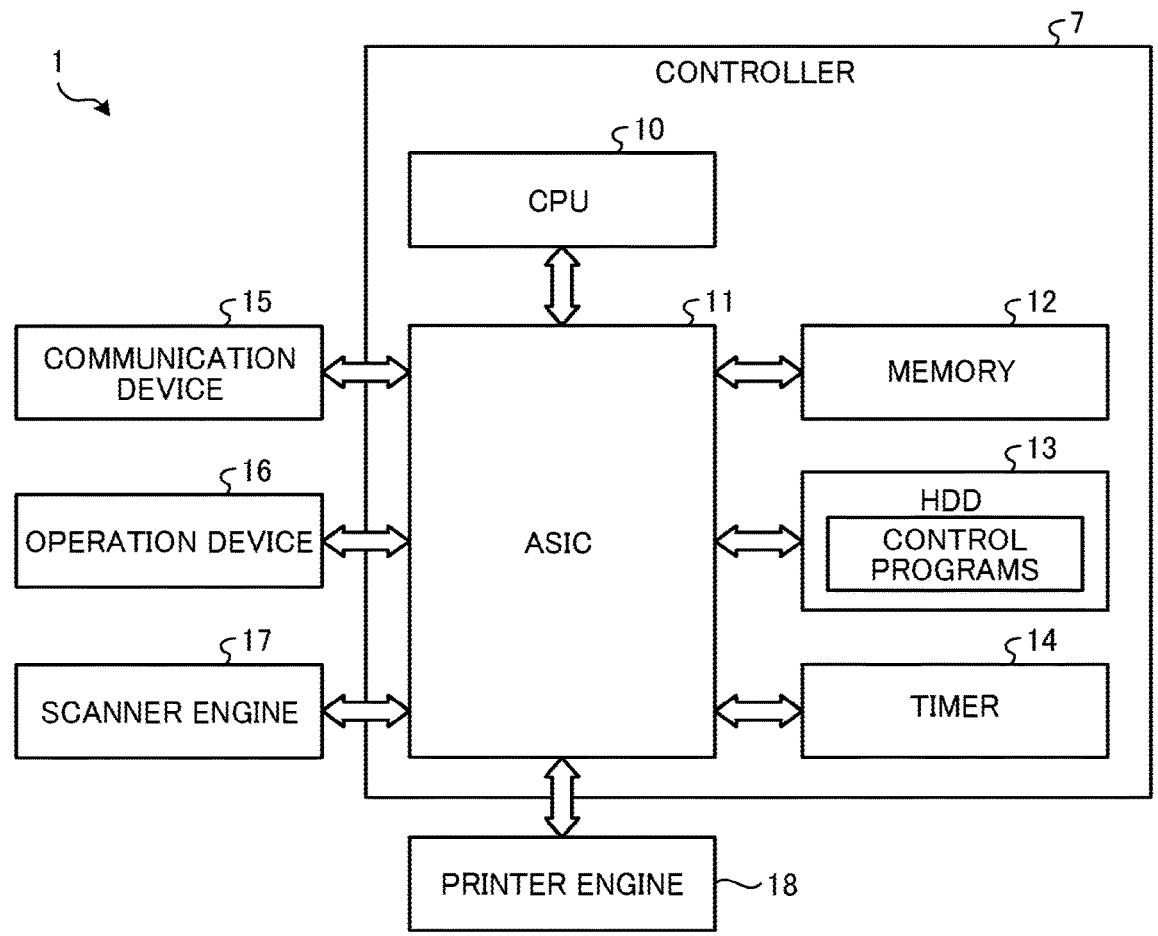
FIG. 2 is a diagram illustrating an example of the hardware configuration of a multifunction peripheral (MFP) forming the voice operation system of the embodiment.

FIG. 2 is a diagram illustrating an example of the hardware configuration of the MFP 1. As illustrated in FIG. 2, the MFP 1 includes a controller 7, a communication device 15, an operation device 16, a scanner engine 17, and a printer engine 18. The MFP 1 further includes an alarm device that communicates a message to the user with sound or light, for example. Examples of the alarm device include, but not limited to, a speaker that outputs sound, an alarm lamp that outputs light, and a display that outputs a message.

The controller 7 includes a central processing unit (CPU) 10, an application specific integrated circuit (ASIC) 11, a memory 12, a hard disk drive (HDD) 13, and a timer 14, which are communicably connected to each other via a bus line.

The communication device 15 is connected to the network 5 to communicate with the cloud system 3. The communication device 15 transmits apparatus information of the MFP 1 to the cloud system 3, and acquires an instruction from the cloud system 3 as the job execution command. The instruction is a scan instruction or a print instruction, for example, input in voice via the terminal 2.

The operation device 16 is implemented as a touch panel integrating a liquid crystal display (LCD) and a touch sensor. When specifying settings or issuing a job execution command, the user touches and operates a software key of the operation device 16 (i.e., an operation button displayed on the operation device 16). In the present embodiment, the operation of the MFP 1 such as the setting of the MFP 1 is performed based on voice input to the terminal 2. However, it is also possible to instruct the controller 7 to execute settings or an operation through normal (i.e., manual) operation of the operation device 16. Particularly when performing a printing or scanning operation with the MFP 1, a final execution operation after various settings is desired to be performed with an operation button of the operation device 16 of the MFP 1. The above-described alarm device may be included in or provided separately from the operation device 16. The operation device 16 outputs screen information, audio information, and optical information. That is, the operation device 16 displays a screen to notify the user of information, and blinks a lamp or outputs sound such as alarm sound to notify the user of an error.

The scanner engine 17 is a controller that controls an image reading device to optically read a document. The printer engine 18 is a controller that controls an image forming device to print an image on a transfer sheet, for example. The CPU 10 performs overall control of the MFP 1. The ASIC 11 is implemented as a large-scale integration (LSI) circuit that performs various image processing for images to be processed by the scanner engine 17 and the printer engine 18. The CPU 10 selectively executes various applications, such as a scanner application and a printer application, to thereby cause various engines to execute the job execution command with the respective applications.

The memory 12 stores fixed data. The HDD 13 stores control programs and data. The control programs and data include an operating system (OS), various applications, image data for use in the execution of the applications, font data, and various files. The controller 7 may include a solid state drive (SSD) in place of or in addition to the HDD 13.

A hardware configuration of the terminal 2 will be described.

Figure 3:
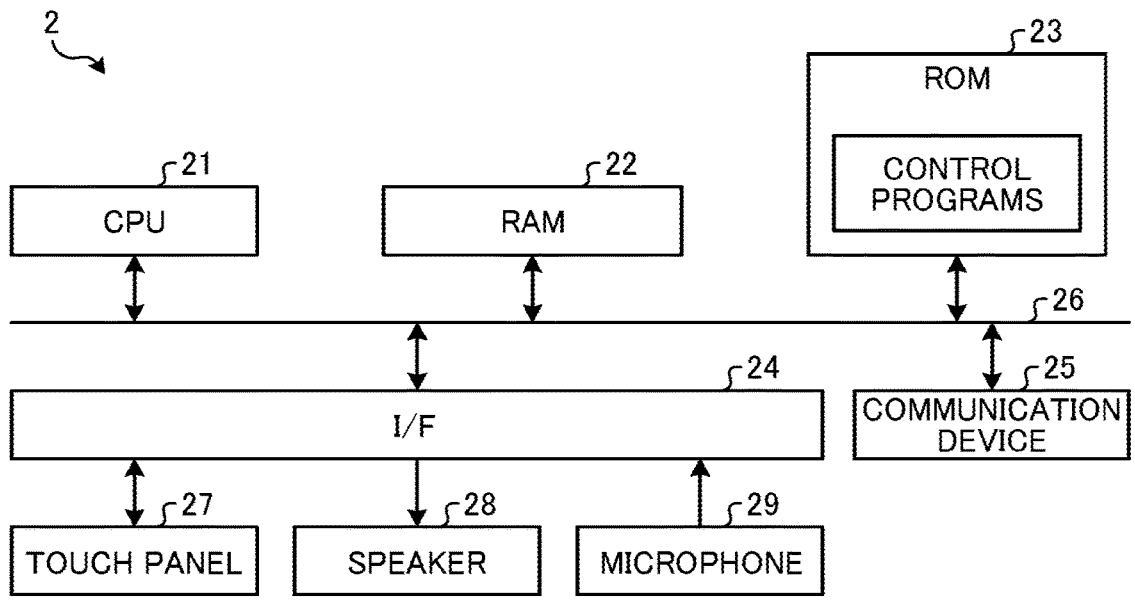
FIG. 3 is a diagram illustrating an example of the hardware configuration of a terminal forming the voice operation system of the embodiment.

FIG. 3 is a diagram illustrating an example of the hardware configuration of the terminal 2. As illustrated in FIG. 3, the terminal 2 includes a CPU 21, a random access memory (RAM) 22, a read only memory (ROM) 23, an interface (I/F) 24, and a communication device 25, which are connected to each other via a bus line 26.

The ROM 23 stores control programs. The control programs include an operation processing program. The CPU 21 executes the control programs stored in the ROM 23. The RAM 22 is used as a work area of the CPU 21.

The I/F 24 is connected to a touch panel 27, a speaker 28, and a microphone 29. The microphone 29 collects voices of telephone call conversations and user utterances, for example, and inputs the voices as audio signals. The speaker 28 outputs sound as a response to the user, for example. The touch panel 27 receives an operation performed thereon by the user, and displays data, such as text data or image data, to the user.

The thus-configured terminal 2 transmits the audio signals input via the microphone 29 to the cloud system 3 via the communication device 25. The terminal 2 further performs control such as causing the touch panel 27 to display the data (e.g., audio data, text data, or image data) acquired from the cloud system 3 via the communication device 25 and causing the speaker 28 to output the audio data as sound.

A hardware configuration of the cloud system 3 will be described.

Figure 4:
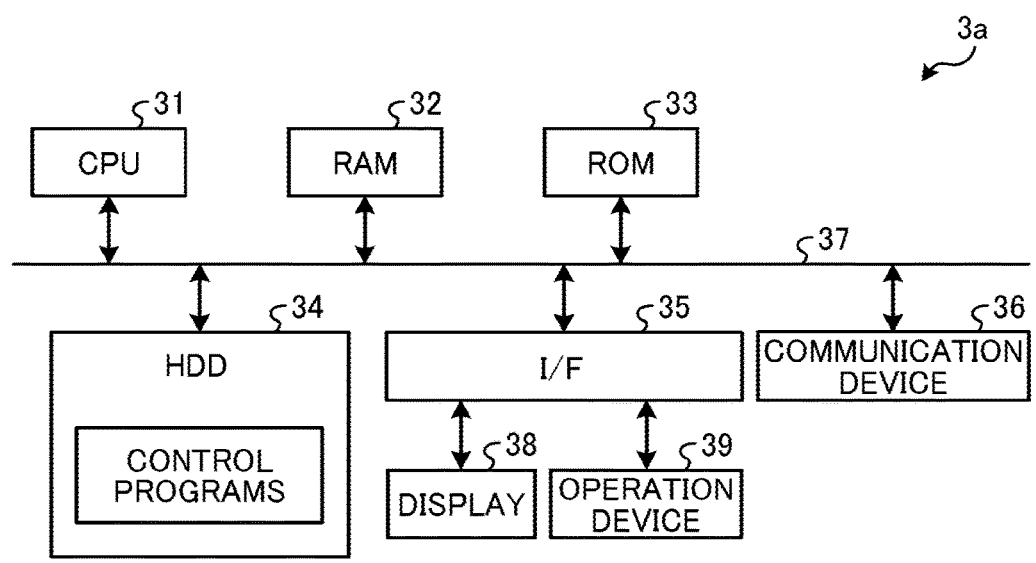
FIG. 4 is a diagram illustrating an example of the hardware configuration of a cloud service apparatus forming the voice operation system of the embodiment.

The cloud system 3 provides the cloud service with one server or a plurality of servers cooperating with each other. FIG. 4 is a diagram illustrating an example of the hardware configuration of such a server (hereinafter referred to as the cloud service apparatus 3a).

Figure 5:
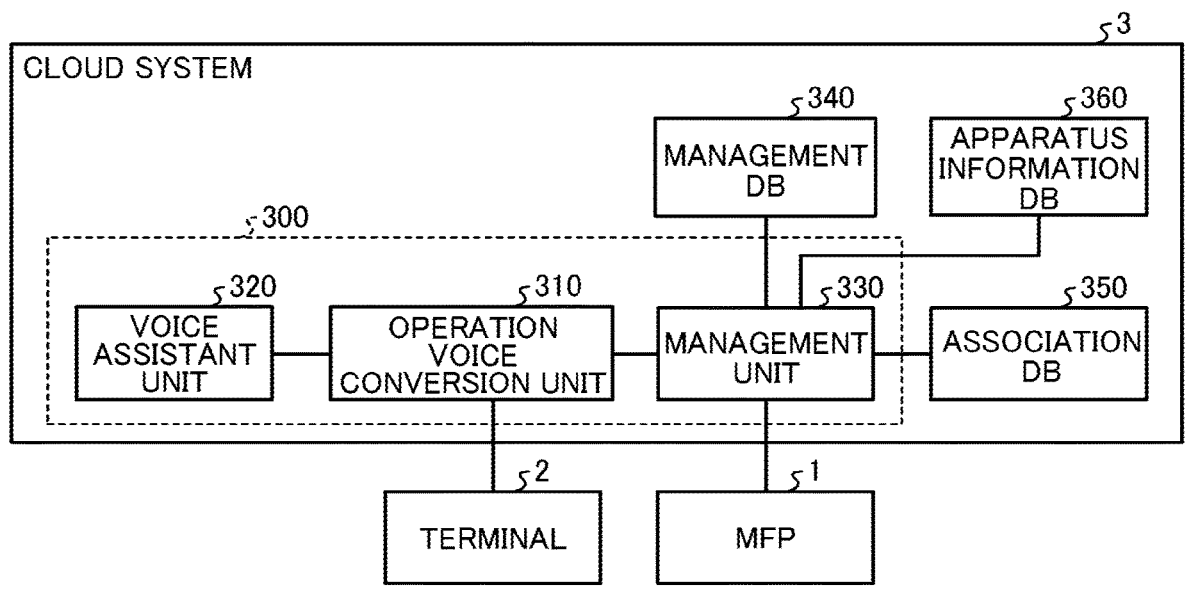
FIG. 5 is a diagram illustrating overall functions of a cloud system forming the voice operation system of the embodiment.

As illustrated in FIG. 4, the cloud service apparatus 3a includes a CPU 31, a RAM 32, a ROM 33, an HDD 34, an I/F 35, and a communication device 36, which are connected to each other via a bus line 37. The I/F 35 is connected to a display 38 and an operation device 39. The HDD 34 stores control programs and databases. The control programs include an operation voice conversion program, a voice assistant program, and a management program, for example. The databases include a management database (DB) 340, an association DB 350, and an apparatus information DB 360, for example, as illustrated in FIG. 5.

The ROM 33 stores fixed programs. The CPU 31 executes programs stored in the ROM 33 and the HDD 34. The RAM 32 is used as a work area of the CPU 31.

The operation voice conversion program, the voice assistant program, and the management program may be stored in and executed by one cloud service apparatus 3a. Alternatively, part of these programs may be dispersedly stored in and executed by a plurality of cloud service apparatuses 3a such that the plurality of cloud service apparatuses 3a cooperate with each other to provide the cloud service.

Further, the management DB 340, the association DB 350, and the apparatus information DB 360 may be included in one cloud service apparatus 3a together with the operation voice conversion program, the voice assistant program, and the management program. Alternatively, these databases may be dispersedly stored in a plurality of cloud service apparatuses 3a. For example, one or all of the management DB 340, the association DB 350, and the apparatus information DB 360 may be stored in another server accessible via the network 5.

An overall functional configuration of the cloud system 3 will be described.

FIG. 5 is a diagram illustrating an overview of overall functions of the cloud system 3. FIG. 5 illustrates major functions of the cloud system 3 for providing the cloud service. Details of these major functions of the cloud system 3 and functions of the MFP 1 and the terminal 2 illustrated in FIG. 5 will be described later with reference to FIGS. 6 to 8.

The functions of the cloud system 3 are implemented with one or more cloud service apparatuses 3a, and are appropriately set in the one or more cloud service apparatuses 3a.

The CPU 31 of the cloud service apparatus 3a reads the operation voice conversion program stored in the HDD 34, and deploys and executes the operation voice conversion program in the RAM 32, to thereby function as an operation voice conversion unit 310. The operation voice conversion unit 310 has a function of converting audio data into text data. The operation voice conversion unit 310 further has a function of determining whether the text data matches previously defined dictionary information, and if the text data matches the dictionary information, converting the text data into an action reflecting the intension of the user and parameters representing variables of job conditions, for example.

The CPU 31 of the cloud service apparatus 3a further reads the voice assistant program stored in the HDD 34, and deploys and executes the voice assistant program in the RAM 32, to thereby function as a voice assistant unit 320. The voice assistant unit 320 has a function of holding the dictionary information.

The CPU 31 of the cloud service apparatus 3a further reads the management program stored in the HDD 34, and deploys and executes the management program in the RAM 32, to thereby function as a management unit 330. The management unit 330 has a function of converting the text data into a job execution command in a format compatible with the registered MFP 1 based on the action and the parameters, and transmitting the job execution command to the MFP 1.

In the thus-configured cloud system 3, a cloud service unit 300 provides the cloud service with at least the functions of the operation voice conversion unit 310, the voice assistant unit 320, and the management unit 300.

The cloud service unit 300 stores a variety of information in databases based on communication with the MFP 1 and the terminal 2. For example, the management unit 330 manages the variety of information by using the management DB 340, the association DB 350, and the apparatus information DB 360.

The management DB 340 is a database that stores data (e.g., text data, image data, or audio data) of content of the cloud service provided by the cloud service unit 300.

The association DB 350 is a database that stores information of an information processing apparatus (i.e., an external apparatus) to be associated with the terminal 2. In the present example, in which the terminal 2 and the MFP 1 associated therewith are the smart speaker and the information processing apparatus, respectively, the association DB 350 stores a device identification (ID) of the smart speaker and an apparatus ID of the information processing apparatus in association with each other. The smart speaker and the information processing apparatus may be associated with each other on a one-to-one basis. Alternatively, the smart speaker may be associated with a plurality of information processing apparatuses. That is, the type and number of information processing apparatuses associated with one device ID are not limited. Further, the method of associating the information processing apparatus with the smart speaker is not limited to the above-describe method. That is, the information processing apparatus may be associated with user identifying information such as a user account or a user ID. In this case, information identifying the smart speaker (e.g., the device ID), which is transmitted to the cloud system 3 from the smart speaker, and the user identifying information may be stored in the association DB 350 of the cloud system 3, for example, and the management unit 330 may identify the information processing apparatus based on the user identifying information associated with the device ID. Alternatively, the smart speaker may transmit to the cloud system 3 the user identifying information in place of the device ID. Further, the information of the information processing apparatus may be associated with information identifying an organization, such as a company or a department therein, or information identifying a place, such as a building or a room, in place of the user identifying information. In this case, one or more smart speakers and one or more information processing apparatuses may be associated with each other.

The apparatus information DB 360 is a database that stores the apparatus ID of each information processing apparatus such as the MFP 1 and the apparatus information of the information processing apparatus in association with each other.

Functions of the terminal 2 will be described.

Figure 6:
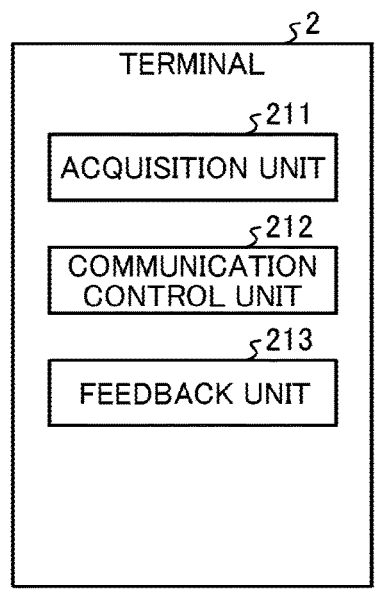
FIG. 6 is a diagram illustrating a configuration example of functional blocks of the terminal of the embodiment.

FIG. 6 is a diagram illustrating a configuration example of functional blocks of the terminal 2. The CPU 21 of the terminal 2 executes the operation processing program stored in the ROM 23, to thereby function as an acquisition unit 211, a communication control unit 212, and a feedback unit 213, as illustrated in FIG. 6.

The acquisition unit 211 acquires the voice of the user collected via the microphone 29 in FIG. 3, i.e., the instruction voice of the user for the voice operation of the MFP 1. Alternatively, the acquisition unit 211 may acquire data of the user operation via the touch panel 27 in FIG. 3 or a physical switch. The communication control unit 212 controls communication with the cloud system 3. The communication control unit 212 communicates with the cloud system 3 to transmit the information acquired by the acquisition unit 211 to the cloud system 3 or acquire text data, image data, or audio data from the cloud system 3. When transmitting the information acquired by the acquisition unit 211 to the cloud system 3, the communication control unit 212 may transmit the device ID of the terminal 2 to the cloud system 3 together with the acquired information.

The feedback unit 213 outputs audio feedback to the user to prompt the user to input missing data or confirm the input, for example, to implement an interactive voice input operation. The feedback unit 213 may also control display of the touch panel 27 to output feedback to the user as text or an image.

In the present example, the acquisition unit 211, the communication control unit 212, and the feedback unit 213 are implemented by software. Alternatively, part or all of these units may be implemented by hardware such as an integrated circuit (IC). Further, the functions of these units may be implemented by the operation processing program alone. Alternatively, a part of the processing of these units may be executed by another program, or may be indirectly executed with another program.

Details of functions of the cloud service unit 300 will be described.

Figure 7:
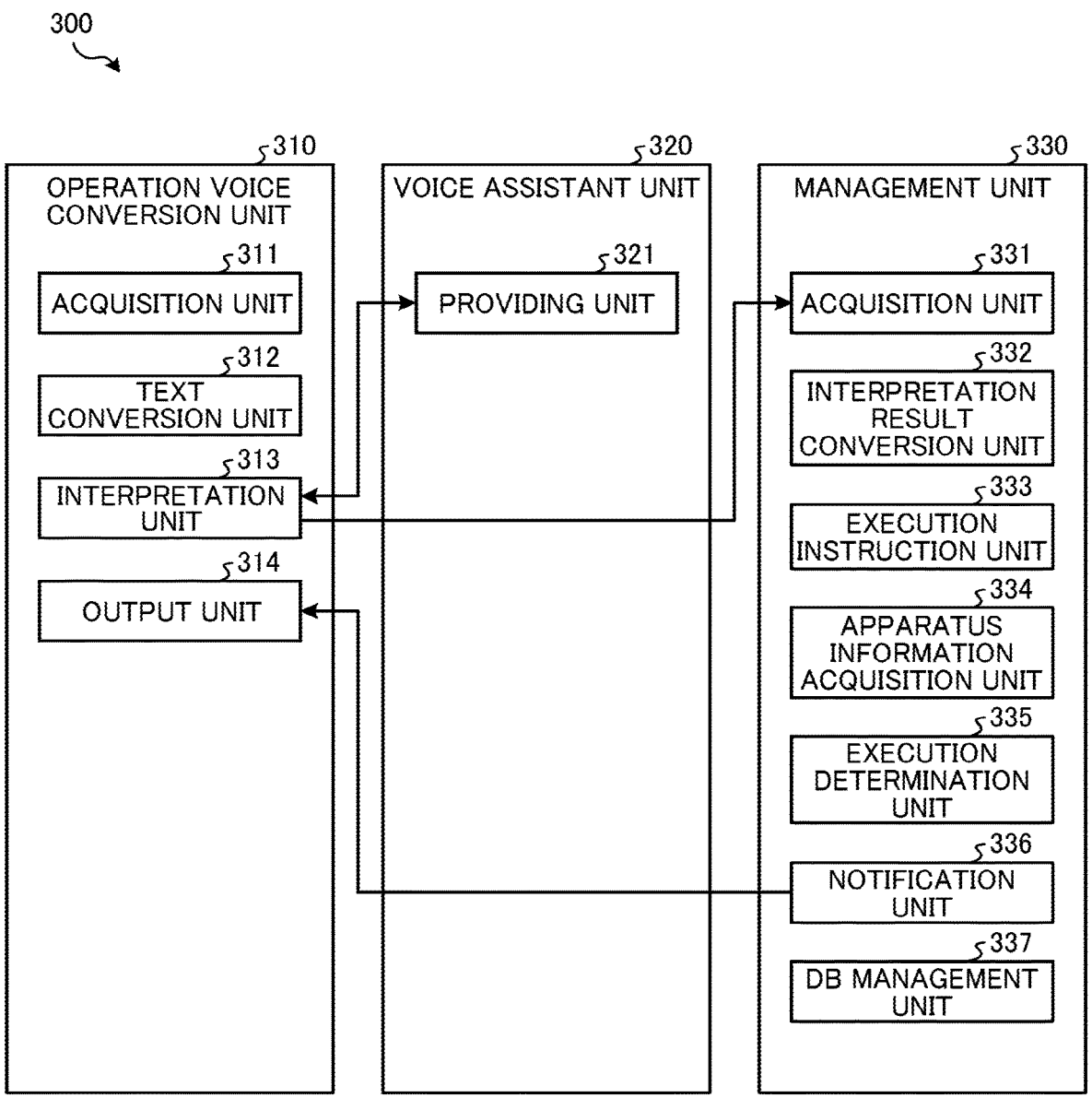
FIG. 7 is a diagram illustrating a configuration example of functions of a cloud service unit in the cloud system of the embodiment.

FIG. 7 is a diagram illustrating a configuration example of functions of the cloud service unit 300. As illustrated in FIG. 7, the operation voice conversion unit 310 includes functions such as an acquisition unit 311, a text conversion unit 312, an interpretation unit 313, and an output unit 314.

The acquisition unit 311 acquires the audio data transmitted from the terminal 2 (i.e., the audio data of the input voice of the user). The acquisition unit 311 may also acquire data representing an operation performed by the user on the touch panel 27 or a physical switch (e.g., a button) of the terminal 2. The text conversion unit 312 includes a speech-to-text (STT) function that converts audio data (i.e., the audio data of the voice of the user input to the terminal 2) into text data. The interpretation unit 313 interprets the contents of the user instruction based on the text data converted by the text conversion unit 312. Specifically, the interpretation unit 313 determines whether a word or phrase included in the text data converted by the text conversion unit 312 matches the dictionary information provided by the voice assistant unit 320. Then, if the word or phrase in the text data matches the dictionary information, the interpretation unit 313 converts the text data into the action representing the type of job and the parameters representing the variables of the job conditions, for example. The interpretation unit 313 then transmits the action and the parameters to the management unit 330 together with the device ID identifying the terminal 2 as the source of the acquired audio data, for example. The output unit 314 includes a text-tospeech (TTS) function that generates audio data from text data. The output unit 314 controls the communication of the communication device 36 in FIG. 4 to transmit data, such as text data, audio data, or image data, to the terminal 2.

In the present example, the acquisition unit 311, the text conversion unit 312, the interpretation unit 313, and the output unit 314 are implemented by software. Alternatively, part or all of these units may be implemented by hardware such as an IC. Further, the functions of these units may be implemented by the operation voice conversion program alone. Alternatively, a part of the processing of these units may be executed by another program, or may be indirectly executed with another program. Further, part or all of the functions of the interpretation unit 313 implemented by the operation voice conversion program may be executed by the voice assistant program. In this case, the voice assistant unit 320 determines whether a word or phrase included in the text data matches the dictionary information, for example. Further, if the word or phrase in the text data matches the dictionary information, the voice assistant unit 320 converts the text data into the action representing the intension of the user and the parameters representing the variables of the job conditions, for example. In this case, therefore, the interpretation unit 313 simply acquires the action and the parameters from the voice assistant unit 320.

As illustrated in FIG. 7, the voice assistant unit 320 has the function of a providing unit 321. The providing unit 321 manages the dictionary information, which previously defines the relationship between the text data, the action, and the parameters. The providing unit 321 provides the dictionary information to the operation voice conversion unit 310. The voice assistant unit 320 may receive the text data from the operation voice conversion unit 310 and interpret the operation instruction from the user based on the text data. For example, the voice assistant unit 320 may acquire the text data from the interpretation unit 313, and determine whether a word or phrase included in the text data matches the dictionary information. Then, if the word or phrase in the text data matches the dictionary information, the voice assistant unit 320 may convert the text data into an action and parameters and provide the action and the parameters to the interpretation unit 313.

In the present example, the voice assistant unit 320 including the providing unit 321 is implemented by software. Alternatively, part or all of the voice assistant unit 320 may be implemented by hardware such as an IC. Further, functions such as the providing unit 321, for example, may be implemented by the voice assistant program alone. Alternatively, a part of the processing of the providing unit 321 may be executed by another program, or may be indirectly executed with another program.

As illustrated in FIG. 7, the management unit 330 includes functions such as an acquisition unit 331, an interpretation result conversion unit 332, an execution instruction unit 333, an apparatus information acquisition unit 334, an execution determination unit 335, a notification unit 336, and a DB management unit 337.

The acquisition unit 331 acquires the interpretation result from the interpretation unit 313.

The interpretation result conversion unit 332 converts the interpretation result (e.g., action and parameters) converted by the operation voice conversion unit 310 into a job execution command compatible with the MFP 1.

The execution instruction unit 333 transmits the job execution command to the MFP 1 to instruct the MFP 1 to execute the job. Specifically, the execution instruction unit 333 acquires the action and parameters and the device ID of the terminal 2 having received the voice instruction from the user. The execution instruction unit 333 searches through the association DB 350 in FIG. 5 for the MFP 1 corresponding to the acquired device ID, and transmits the job execution command to the MFP 1 retrieved by the search.

The apparatus information acquisition unit 334 acquires the apparatus information from each registered information processing apparatus (i.e., the MFP 1 in the present example). For example, the apparatus information acquisition unit 334 acquires information representing the processing capability of the MFP 1, such as the maximum processsable pixel number of the MFP 1. The apparatus information acquisition unit 334 further acquires, as appropriate, information of the apparatus state in accordance with the settings. The information of the apparatus state includes information representing the connection state indicating whether communication connection with the MFP 1 is established, the power state of the MFP 1 such as the power-on state, the power-off state, or the sleep-mode state, the occurrence or non-occurrence of an error and the type of the error, the remaining amounts of consumables such as paper and toner, the login state of the user, and authorization information representing functions authorized to be used by the logged-in user.

If the apparatus information such as the processing capability is acquired from a plurality of MFPs 1, the apparatus information acquisition unit 334 manages, in the apparatus information DB 360 in FIG. 5, the apparatus information of each of the MFPs 1 in association with information identifying the MFP 1 such as the apparatus ID of the MFP 1.

The execution determination unit 335 compares the processing capability of the MFP 1 with the user-specified job (i.e., the action and parameters generated by the operation voice conversion unit 310), to thereby determine whether the user-specified job is executable (i.e., performable) in the MFP 1. If it is determined that the user-specified job is executable in the MFP 1, the execution determination unit 335 transmits the job execution command to the MFP 1. If it is determined that the user-specified job is inexecutable (i.e., unperformable) in the MFP 1, the execution determination unit 335 may cause the notification unit 336 to feed back an error message to the terminal 2 via the operation voice conversion unit 310 as response information.

The notification unit 336 transmits data (e.g., text data, audio data, or image data) to the operation voice conversion unit 310 as a response to the job execution instruction from the user. If any of the parameters representing the job conditions for executing the job is unspecified, the notification unit 336 transmits feedback to the terminal 2 via the operation voice conversion unit 310, to thereby prompt the user to specify the unspecified parameter. In this case, the notification unit 336 may transmit parameter information as information for checking with the user about the unspecified parameter. Further, the notification unit 336 may transmit text data, audio data, or image data as information for prompting the user to specify the unspecified parameter.

The DB management unit 337 manages the management DB 340, the association DB 350, and the apparatus information DB 360. Specifically, the DB management unit 337 executes setting of various tables and registration, retrieval, deletion, and updating of data in the various tables, for example. For instance, based on information and an instruction input to the MFP 1, the terminal 2, or a client device of the cloud service apparatus 3a, the DB management unit 337 registers the device ID of the terminal 2 and the apparatus ID of the MFP 1 in association with each other in the association DB 350. The association DB 350 holds information associating the device ID of the terminal 2 with the apparatus ID of the MFP 1 in table data format, for example.

Functions of the MFP 1 will be described.

Figures 8, 9:
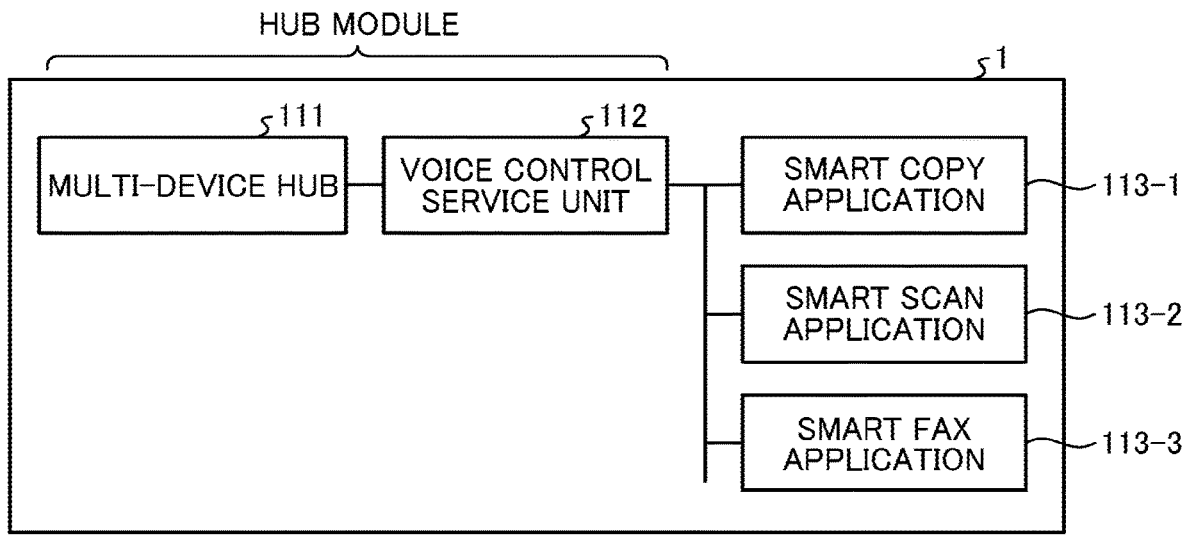
FIG. 8 is a diagram illustrating a configuration example of functional blocks of the MFP of the embodiment.
FIG. 9 is a diagram illustrating an example of entity information of the embodiment.

FIG. 8 is a diagram illustrating a configuration example of functional blocks of the MFP 1. The CPU 10 of the MFP 1 executes various programs stored in the memory 12 and the HDD 13, to thereby function as a multi-device hub 111, a voice control service unit 112, a smart copy application 113-1, a smart scan application 113-2, and a smart FAX application 113-3, for example, as illustrated in FIG. 8. The multi-device hub 111 and the voice control service unit 112 form a hub module.

The multi-device hub 111 receives the job execution command from the cloud system 3. The multi-device hub 111 further collects information of the apparatus state and the settings of the MFP 1, and transmits information of the functions and the state of the MFP 1 to the cloud system 3. The multi-device hub 111 transmits the information of the apparatus state to the cloud system 3 periodically or when the apparatus state changes. The voice control service unit 112 receives the job execution command received by the multi-device hub 111, and executes processing based on the job execution command. The voice control service unit 112 interprets the received job execution command, and starts the target application based on the interpretation result to request the application to reflect the command in the settings or start the job.

The smart copy application 113-1 is an application for executing copying. The smart scan application 113-2 is an application for executing scanning. The smart FAX application 113-3 is an application for executing facsimile transmission. As well as these applications, an application for managing address information of the user and an application for transmitting data or a file to a specified address are also included in the MFP 1. Processing of each of the applications is executed in accordance with the received command.

Each of the above-described programs may be provided as recorded on a computer-readable recording medium such as a compact disc (CD)-ROM or a flexible disk (FD) in an installable or executable file format. Further, the program may be provided as recorded on a computer-readable recording medium such as a CD-recordable (R), a digital versatile disk (DVD), a Blu-ray disc (registered trademark), or a semiconductor memory. Further, the program may be installed in the corresponding device or apparatus via a network such as the Internet, or may be previously stored in a ROM or another memory of the device or apparatus.

Setting of the dictionary information will be described.

As described above, the dictionary information is stored in the cloud system 3 (e.g., the HDD 34 of the cloud service apparatus 3*a*). The interpretation unit 313 of the operation voice conversion unit 310 in the cloud system 3 determines whether a word or phrase included in the text data converted from the audio data matches the dictionary information. If the word or phrase in the text data matches the dictionary information, the interpretation unit 313 generates the interpretation result including the action and the parameters defined in the dictionary information. The dictionary information may be in any format as long as it is possible to generate the action and the parameters based on the dictionary information. For example, the dictionary information includes entity information, action information, and association information. The entity information associates a parameter of a job with a natural language. It is possible to register a plurality of synonyms for one parameter. The action information represents the type of the job. The association information associates a phrase uttered by the user in the natural language with the entity information, and associates the phrase uttered by the user in the natural language with the action information. The association information enables correct interpretation even if the order of utterance of the parameter or the nuance of the parameter is somewhat changed. Further, the association information may be used to generate response text of the interpretation result based on the input data.

FIG. 9 illustrates an example of the entity information, specifically the entity information corresponding to print color. In FIG. 9, a character string "printColor" represents the entity name, and character strings on the left side such as "auto color," "monochrome," and "color" represent parameter names. Further, in FIG. 9, phrases on the right side such as "auto color," "monochrome, black and white" and "color, full color" represent synonyms.

As understood from FIG. 9, parameters and synonyms thereof are stored in association with each other as the entity information. That is, the synonyms are registered as well as the parameters. For example, therefore, when issuing an instruction to make monochrome copies, both utterances "Please make black-and-white copies" and "Please make monochrome copies" enable parameter setting.

FIG. 10 illustrates examples of user utterance phrases, action name, and entity information. In FIG. 10, the action name is included in a section under title "Action," and the entity information is included in a section under title "Entity." The remaining parts of FIG. 10 illustrate examples of the user utterance phrases. FIG. 10 illustrates a display example on a screen of the display 38 of the cloud service apparatus 3*a*. In this example, one of the user utterance phrases is dragged, as indicated by the arrow in FIG. 10, through the operation of the operation device 39. This drag operation may be performed on a display screen of a personal computer (PC) of an administrator accessing the cloud system 3 via the network 5.

For example, the entity information to be associated with the corresponding information is selected through the above-described operation. Further, if the value is set in the selected entity information, the parameter included in the response is changed. For example, if the value is set as "SprintColor" for the utterance "Please make black-and-white copies," "printColor=monochrome" is returned as the return value. If the value is set as "SprintColor.original," "printColor=black and white" is returned as the return value, and the same contents as those of the user utterance are returned as the parameter in the response.

An overall procedure of the voice input operation of the voice operation system 100 will be described.

FIG. 11 is a sequence diagram illustrating an example of a basic overall procedure of the voice input operation performed in the voice operation system 100. FIG. 11 illustrates an example in which the MFP 1 has a duplex copy function and the user issues an instruction to the MFP 1 to execute duplex copying through the voice input operation via the terminal 2. In this case, the operation processing program of the terminal 2 may be started at the same time as the start-up of the terminal 2. Alternatively, the operation processing program may be started when a predetermined operation is performed on the terminal 2 or when predetermined sound is input to the terminal 2.

The user first utters a word or phrase to the terminal 2 to issue an instruction to the MFP 1. In the present example, the user utters a phrase "Make double-sided copies," for instance. The voice of the user is acquired as audio data by the terminal 2 (i.e., the acquisition unit 211) (step S1). The terminal 2 (i.e., the communication control unit 212) transmits the audio data of the utterance "Make double-sided copies" to the cloud system 3 (step S2). In this step, the terminal 2 (i.e., the communication control unit 212) may also transmit the device ID of the terminal 2 to the cloud system 3.

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data of the utterance "Make double-sided copies" into text data, i.e., performs a text data conversion process (step S3).

Then, in the present example, the operation voice conversion unit 310 (i.e., the interpretation unit 313) requests the voice assistant unit 320 (i.e., the providing unit 321) to transmit the dictionary information, and acquires the dictionary information from the voice assistant unit 320 (i.e., the providing unit 321) (step S4).

Further, the operation voice conversion unit 310 (i.e., the interpretation unit 313) interprets the text data based on the acquired dictionary information (step S5). In the present example, the text data includes the phrase "Make double-sided copies." Thus, the operation voice conversion unit 310 (i.e., the interpretation unit 313) interprets that the type (i.e., action) of the job is an action requesting the MFP 1 to execute copying (i.e., ACTION: COPY_EXECUTE). Further, the contents (i.e., parameters) of the action include double-sided. Thus, the operation voice conversion unit 310 (i.e., the interpretation unit 313) interprets that the print side is double-sided (i.e., PARAMETER: PRINT SIDE=DOUBLE-SIDED). The operation voice conversion unit 310 (i.e., the interpretation unit 313) thus interprets, based on the text data, the type (i.e., action) and the contents (i.e., parameters) of the job specified by the user.

The operation voice conversion unit 310 (i.e., the interpretation unit 313) transmits the interpretation result to the management unit 330 (step S6). In this step, the operation voice conversion unit 310 (i.e., the interpretation unit 313) may transmit the device ID of the terminal 2 (i.e., the source of the transmitted audio data) to the management unit 330 in association with the interpretation result.

The management unit 330 (i.e., the interpretation result conversion unit 332) converts the interpretation result acquired from the operation voice conversion unit 310 into a job execution command to the MFP 1 (step S7). TABLE 1 given below illustrates examples of the interpretation result and the job execution command converted from the interpretation result. Information as in TABLE 1 may be stored in a memory such as the HDD 34 of the cloud service apparatus 3*a* such that the management unit 330 (i.e., the interpretation result conversion unit 332) refers to the stored information to convert the interpretation result into the job execution command.

TABLE 1

| Name | Value | Processing of application |
|---|---|---|
| Action | COPY_EXECUTE | Execute copy job |
| | SCAN_EXECUTE | Execute scan job |
| | PRINT_EXECUTE | Execute print job |
| | FAX_EXECUTE | Execute FAX job |
| Parameter | PRINT SIDE | Change setting value of print side |
| | QUANTITY | Change setting value of quantity |
| | *Other parameters specifiable as job setting values | |

In the examples of TABLE 1, "COPY_EXECUTE," "SCAN_EXECUTE," "PRINT_EXECUTE," and "FAX_EXECUTE" are given as examples of the action, and "PRINT_SIDE" and "QUANTITY" are given as examples of the parameter. Examples of the parameter include all other parameters specifiable as job setting values.

The management unit 330 (i.e., the interpretation result conversion unit 332) converts the interpretation result of the action "COPY_EXECUTE" into a job execution command to the MFP 1 to execute the copy job. The management unit 330 (i.e., the interpretation result conversion unit 332) similarly converts the interpretation result of the action "SCAN_EXECUTE" into a job execution command to the MFP 1 to execute the scan job, converts the interpretation result of the action "PRINT_EXECUTE" into a job execution command to the MFP 1 to execute the print job, and converts the interpretation result of the action "FAX_EXECUTE" into a job execution command to the MFP 1 to execute the FAX job.

The above-described jobs are basic jobs executed by the MFP 1. However, the jobs interpretable by the cloud service unit 300 are not limited to the above-described jobs, and may include, for example, a job of causing a communication target (e.g., the MFP 1) to collect and transmit the apparatus information thereof to the cloud service unit 300 and a job of causing a display of the communication target to display predetermined information stored in a memory of the communication target.

Further, if the interpretation result includes the parameter "print side," the management unit 330 (i.e., the interpretation result conversion unit 332) converts the interpretation result into a job execution command to the MFP 1 to change the setting value of the print side. Similarly, if the interpretation result includes the parameter "quantity," the management unit 330 (i.e., the interpretation result conversion unit 332) converts the interpretation result into a job execution command to the MFP 1 to change the setting value of the quantity.

That is, the management unit 330 (i.e., the interpretation result conversion unit 332) converts the interpretation result into the job execution command by determining the intention of the user, such as the type of job to be executed by the MFP 1, for example, based on the information included in the action of the interpretation result, and determining the value included in the parameter of the interpretation result as the job setting value.

The management unit 330 (i.e., the execution instruction unit 333) transmits the thus-obtained job execution command to the MFP 1 (step S8). In the present example, a job execution command "COPY_EXECUTE (PRINT SIDE=DOUBLE-SIDED)" is transmitted to the MFP 1. The management unit 330 (i.e., the execution instruction unit 333) transmits the job execution command to the MFP 1 identified by the DB management unit 337, i.e., transmits an instruction to execute the job to the MFP 1 corresponding to the apparatus ID associated with the device ID of the terminal 2 as the source of the transmitted audio data. Thereby, duplex copying is executed in the MFP 1 corresponding to the terminal 2 implemented as the smart speaker.

Feedback in an interactive operation will be described

The voice operation system 100 of the embodiment implements an interactive system that responds to user input. For example, the voice operation system 100 of the embodiment implements an interactive system by outputting two types of responses: input lack feedback and input confirmation feedback, as well as responses with fixed sentences for interaction, to respond to the operation of the MFP 1.

The input lack feedback is a response output when the information for use in executing the job is incomplete. The input lack feedback is output when the result of user input is not recognized or when a necessary parameter is missing (i.e., unspecified). That is, it is unnecessary to output the input lack feedback when a parameter other than the necessary parameter is unspecified. The input lack feedback may be applied not only to the process of checking with the user about the parameter but also to the process of checking with the user about the function to be used, such as the copy function or the scan function.

The cloud system 3 may check necessary settings depending on the type of the information processing apparatus (i.e., the WP 1 in the present example) currently in communication with the cloud system 3, and may set the parameters of the information processing apparatus. For example, the management unit 330 (i.e., the apparatus information acquisition unit 334) of the cloud system 3 may acquire the apparatus information representing the type and functions of the information processing apparatus at a predetermined time after the communication with the information processing apparatus is established, and the operation voice conversion unit 310 (the output unit 314) may receive the apparatus information and output the apparatus information to the terminal 2 (i.e., the smart speaker). With the feedback unit 213, the terminal 2 is capable of checking with the user about the settings. Alternatively, the feedback unit 213 may determine the parameters, for example. Specifically, in the case of the MFP 1 of the present example, the terminal 2 may check with the user about the functions of the MFP 1, such as the copy function, the print function, the scan function, and the FAX function. Further, the terminal 2 may check with the user about which one of the functions of the MFP 1, such as the copy function, the print function, the scan function, and the FAX function, is to be used. Further, the necessary parameter may be changed in accordance with the setting condition specified by the user. For example, if the setting condition specified by the user is variable magnification printing, the print sheet size is set as the necessary parameter. Further, if the setting condition specified by the user is duplex printing, the setting of whether to print one side or two sides of the document is set as the necessary parameter. Further, if the setting condition specified by the user is bookbind printing, settings such as the finished size and the number of pages to be included in one page are set as the necessary parameters.

The input confirmation feedback is a response output when the information for use in executing the job is complete. For example, the input confirmation feedback is output when all necessary parameters are specified by the user. Further, the input confirmation feedback may be output to prompt the user to select between executing the job with the current setting values and changing the setting values. To check with the user whether to execute the job with the current setting values, each of the parameters specified by the user may be output as sound regardless of whether the parameter is a necessary parameter or not, to thereby prompt the user to confirm the specified parameter.

Information about which one of the parameters is a necessary parameter is previously stored in the cloud system 3 (i.e., a memory of the cloud service apparatus 3a, such as the HDD 34, for example). The necessary parameters stored in the memory (e.g., the HDD 34) may be changed as appropriate with the operation device 39 of the cloud service apparatus 3a or a PC accessible to the cloud service apparatus 3a via the network 5, for example. Based on the necessary parameters stored in the memory (e.g., the HDD 34), the management unit 330 (i.e., the execution determination unit 335) determines whether the action and the parameters transmitted from the operation voice conversion unit 310 meet the necessary parameters.

A procedure of the interactive operation will be described.

Figure 12:
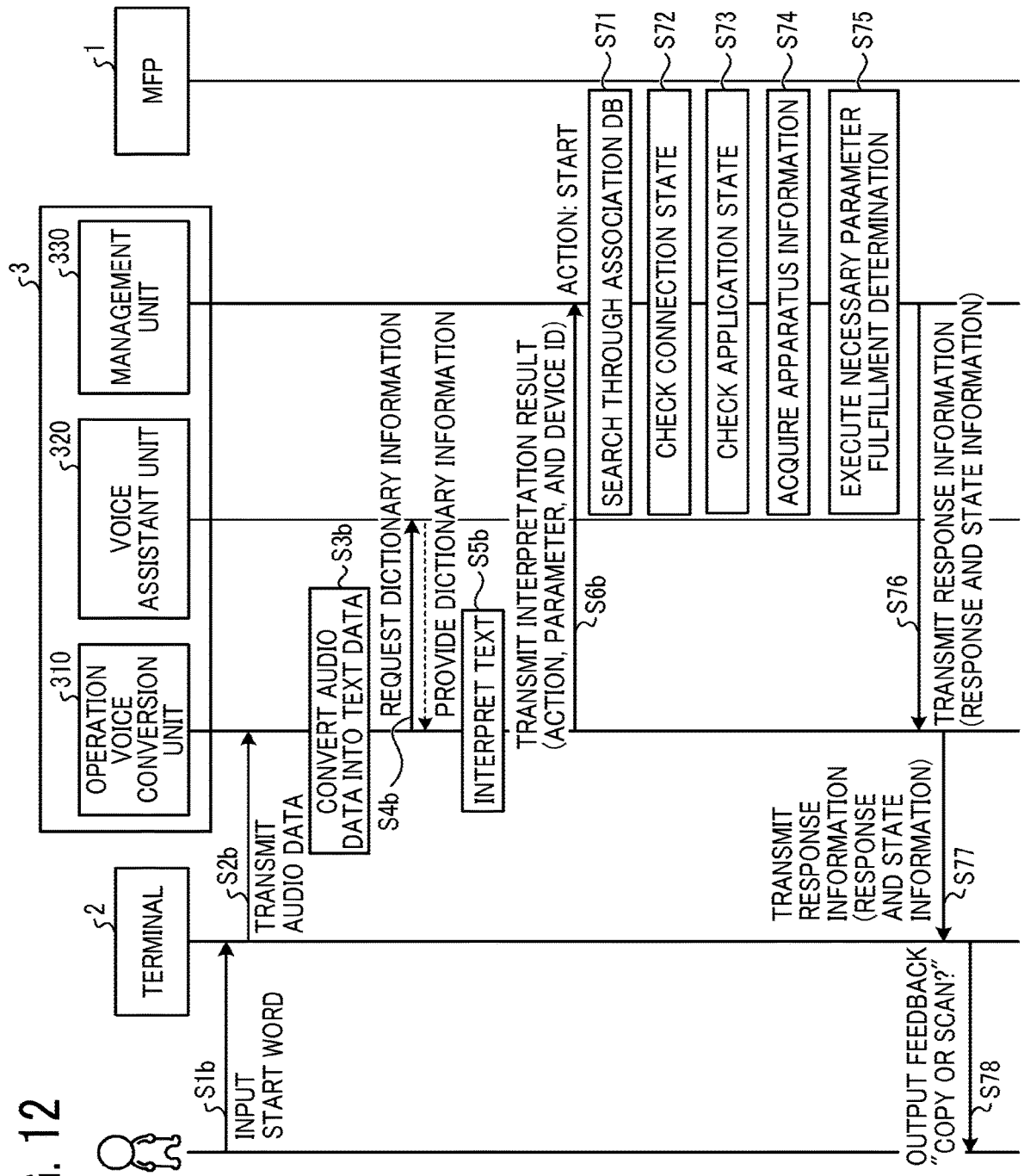
FIG. 12 is a sequence diagram illustrating an example of an operation of the voice operation system of the embodiment to start a voice assistant program to operate the MFP through user interaction with the voice operation system.
Figure 13:
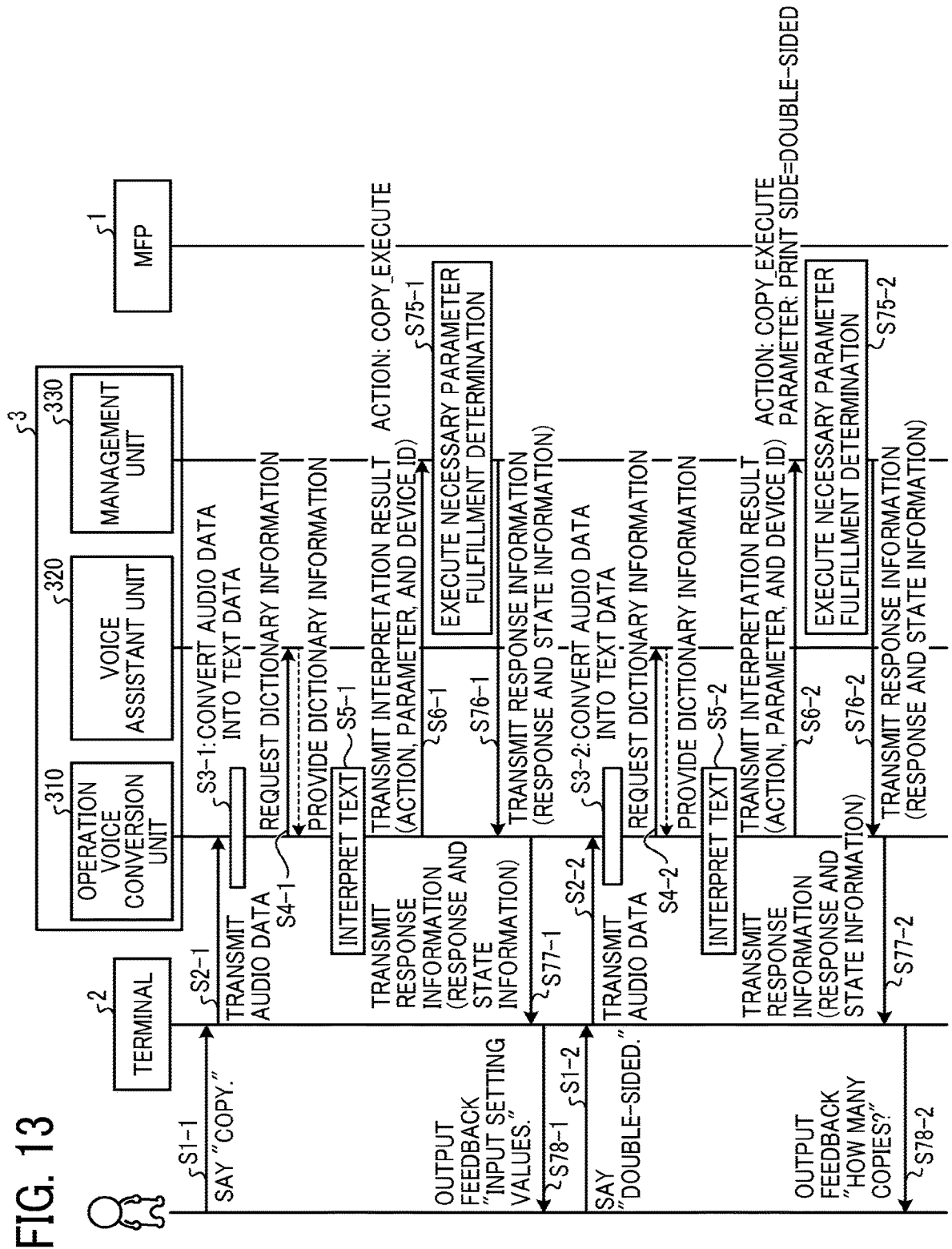
FIGS. 13 to 15 are sequence diagrams illustrating an example of an operation of the voice operation system of the embodiment performed after the start-up of the voice assistant program to operate the MFP through the user interaction with the voice operation system.
Figure 14:
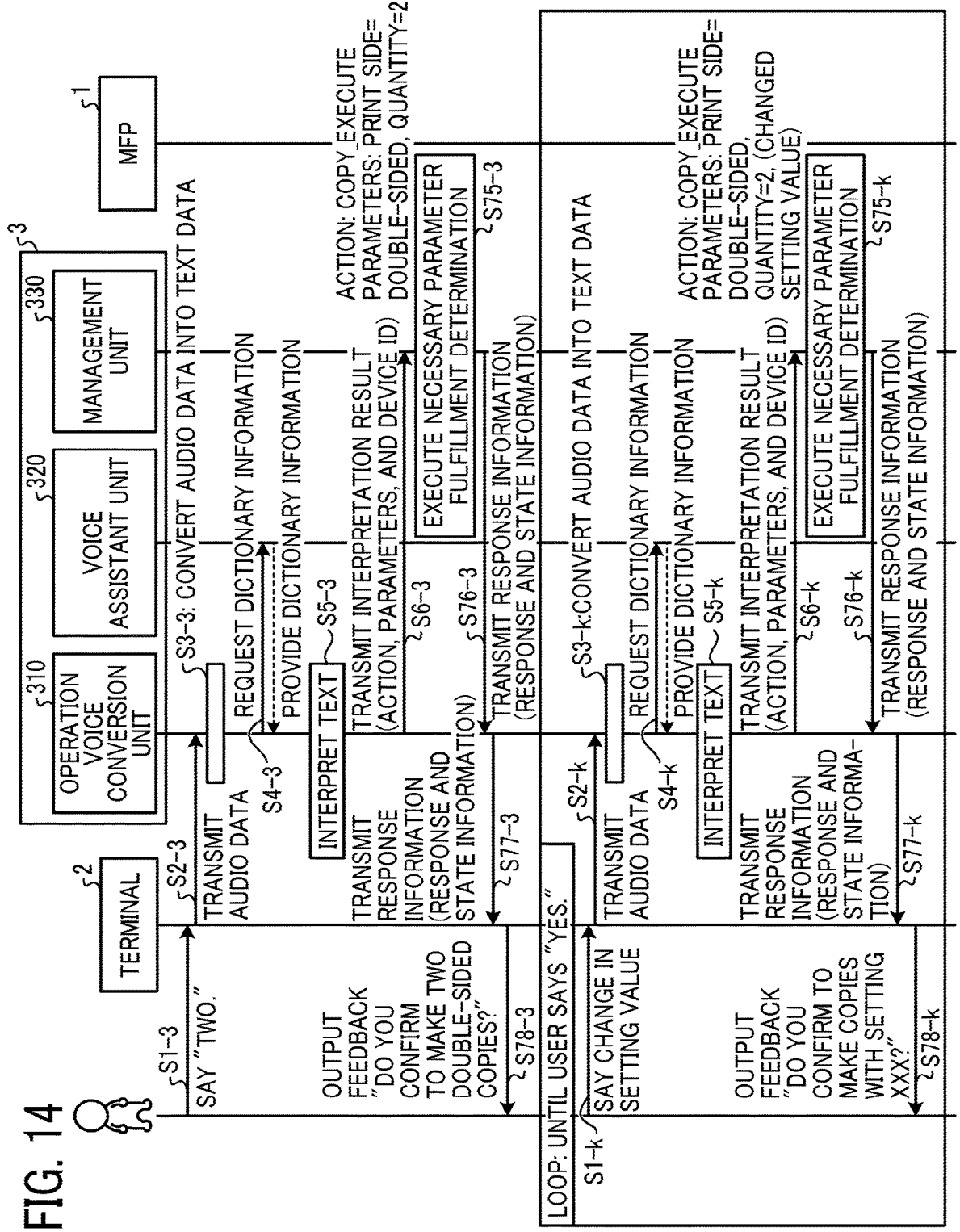
Figure 15:
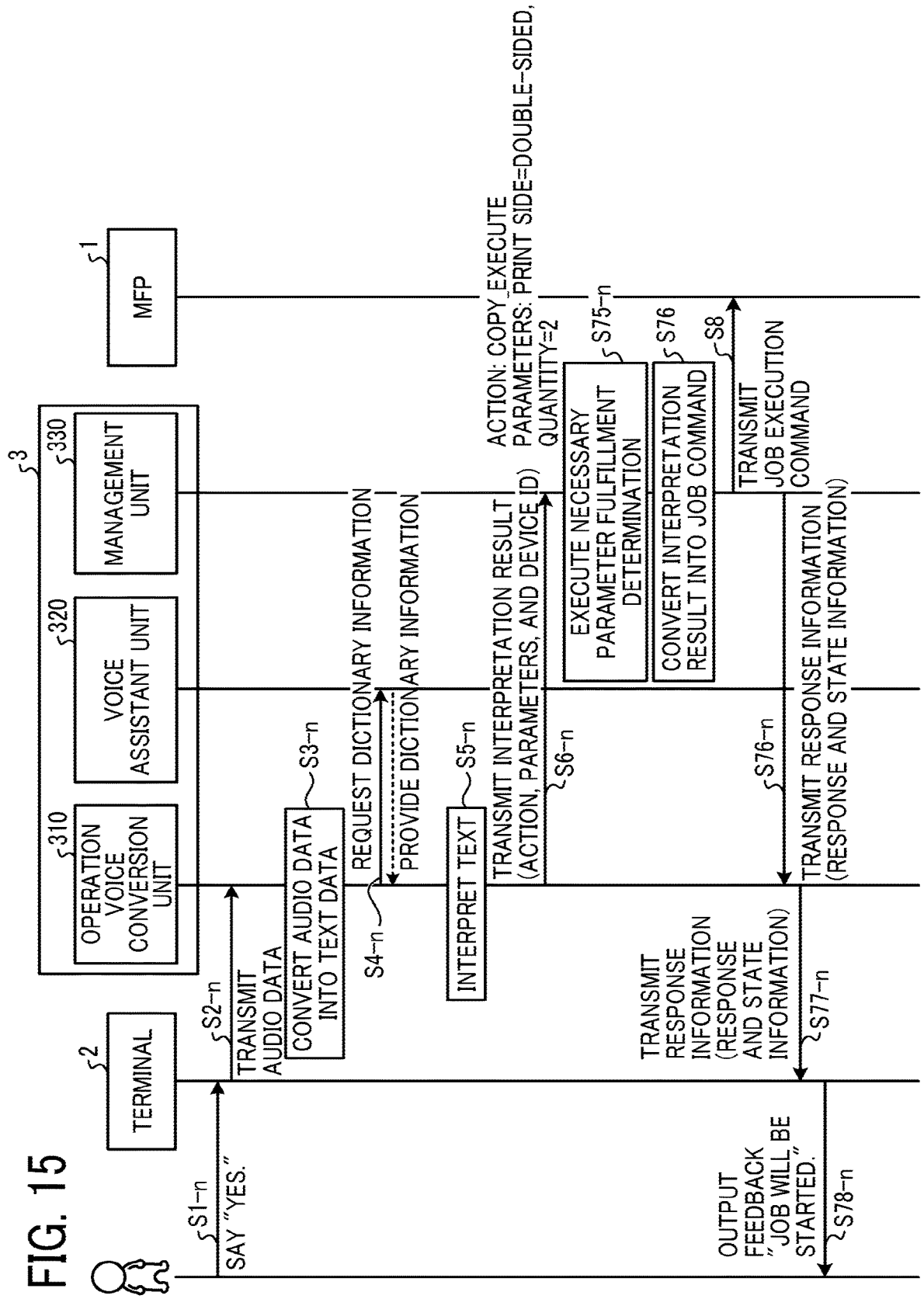

FIGS. 12 to 15 are sequence diagrams illustrating an example of an overall procedure of an operation performed in the voice operation system 100 to operate the MFP 1 based on interaction between the user and the voice operation system 100. FIG. 12 illustrates a procedure of an operation performed when the voice assistant program is started. FIGS. 13 to 15 illustrate a procedure of an interactive operation performed after the start-up of the voice assistant program.

The operation of the MFP 1 based on the interaction with the voice operation system 100 involves the management of the interaction session, which will be described later. The following description will be given of an example in which an instruction to execute an operation of making two double-sided monochrome copies is issued by the user via the terminal 2. In this example, the quantity (i.e., two) is a necessary parameter. However, the necessary parameter is not limited to the quantity, and a plurality of parameters such as monochrome, color, and sheet size may be set as necessary parameters.

The user first performs an operation of starting the operation processing program of the terminal 2, and performs voice input by uttering a start word to the terminal 2, for example (step S1*b*). In this step, the user utters a start word for starting the voice assistant program, to thereby start the voice assistant program. The terminal 2 (i.e., the communication control unit 212) transmits audio data of the start word to the cloud system 3 (i.e., the operation voice conversion unit 310) (step S2*b*).

In the cloud system 3, the operation voice conversion unit 310 (i.e., the acquisition unit 311) acquires the data transmitted from the terminal 2. Then, the operation voice conversion unit 310 (i.e., the text conversion unit 312) converts the audio data into text data, i.e., performs the text data conversion process (step S3*b*).

The operation voice conversion unit 310 (i.e., the interpretation unit 313) requests the voice assistant unit 320 (i.e., the providing unit 321) to transmit the dictionary information, and acquires the dictionary information from the voice assistant unit 320 (i.e., the providing unit 321) (step S4*b*).

The operation voice conversion unit 310 (i.e., the interpretation unit 313) further interprets the text data based on the acquired dictionary information (step S5*b*).

The operation voice conversion unit 310 (i.e., the interpretation unit 313) then transmits the interpretation result to the management unit 330 (step S6*b*).

Then, the management unit 330 executes, as necessary, processes such as search through the association DB 350 (step S71), check of the connection state (step S72), check of the application state (step S73), and acquisition of the apparatus information (step S74). The order of these processes may be changed as appropriate. Further, if any of these processes is performed at a different time, the process may be omitted here.

In the search through the association DB 350 (step S71), the management unit 330 (i.e., the DB management unit 337) searches through the association DB 350 to acquire the apparatus ID of the MFP 1 corresponding to the acquired device ID of the terminal 2. If the apparatus ID of the MFP 1 associated with the device ID fails to be retrieved in this search, the management unit 330 (i.e., the notification unit 336) notifies the user, via the operation voice conversion unit 310 (i.e., the output unit 314), that the terminal 2 is not associated with the communication target (i.e., the MFP 1). For example, the management unit 330 (i.e., the notification unit 336) generates response information including a response "This device is not associated with the apparatus." In this case, the management unit 330 (i.e., the notification unit 336) may include, in the response, guidance on how to associate the device with the communication target. The process of step S71 may be executed at another time when the device ID of the terminal 2 is acquired.

In the check of the connection state (step S72), the management unit 330 checks the apparatus state of the communication target (i.e., the MFP 1 in the present example). For example, the management unit 330 checks the apparatus state with the DB management unit 337 referring to the previously acquired apparatus information stored in the apparatus information DB 360, or with the apparatus information acquisition unit 334 acquiring the apparatus information from the MFP 1 as the communication target. The check of the apparatus state is performed to determine whether it is possible to communicate with the MFP 1 as the communication target and whether the MFP 1 is available, for example. If the connection with the MFP 1 associated with the device ID (i.e., the MFP to be checked) is not established, or if the MFP 1 is being started up and thus is unavailable, for example, the management unit 330 (i.e., the notification unit 336) notifies the user of unavailability of the MFP 1 via the operation voice conversion unit 310 (i.e., the output unit 314). For example, the management unit 330 (i.e., the notification unit 336) generates response information including a response "The apparatus is off-line" or "The apparatus is setting up," and notifies the user of the response information. In this case, the management unit 330 (i.e., the notification unit 336) may include, in the response, guidance on how to respond to the situation. The check of the apparatus state may be executed at another time when the action, the parameters, and the device ID are acquired from the operation voice conversion unit 310 (i.e., the interpretation unit 313).

In the check of the application state (step S73), the management unit 330 checks with the MFP 1 (i.e., the communication target) about the state of the application that executes the function specified by the user. For example, the management unit 330 checks the application state with the DB management unit 337 referring to the previously acquired apparatus information stored in the apparatus information DB 360, or with the apparatus information acquisition unit 334 acquiring the apparatus information from the MFP 1 as the communication target. The check of the application state is performed to determine whether the application is installed in the MFP 1 and whether the application is in an executable state, for example.

If the user specifies the execution of the copy function, and if the application for the copy function is not installed in the MFP 1 associated with the device ID of the terminal 2 or is being started up and thus is unavailable, for example, the management unit 330 (i.e., the notification unit 336) notifies the user of unavailability of the application via the operation voice conversion unit 310 (i.e., the output unit 314). For example, the management unit 330 (i.e., the notification unit 336) generates response information including a response "The application is not installed" or "The application is unavailable now," and notifies the user of the response information. In this case, the management unit 330 (i.e., the notification unit 336) may include, in the response, guidance on how to respond to the situation. The check of the application state may be executed at another time when the action, the parameters, and the device ID are acquired from the operation voice conversion unit 310 (the interpretation unit 313).

In the acquisition of the apparatus information (step S74), the management unit 330 acquires the apparatus information of the communication target (i.e., the MFP 1 in the present example). For example, the DB management unit 337 acquires the previously acquired apparatus information stored in the apparatus information DB 360. Alternatively, the apparatus information acquisition unit 334 may acquire the apparatus information from the MFP 1 as the communication target. The apparatus state acquired in this step is used to determine whether the MFP 1 as the communication target is capable of executing the job with the job type and the job conditions specified by the user, for example.

If the above-described processes are completed after the start-up operation, the management unit 330 (i.e., the execution determination unit 335) executes necessary parameter fulfillment determination (step S75). In the necessary parameter fulfillment determination, based on the action and the parameters of the interpretation result, the management unit 330 (i.e., the execution determination unit 335) determines whether all conditions for the job execution are met.

If the job type and the necessary job setting conditions are all specified when the instruction to start the voice assistant program is issued, the job execution command may be transmitted to the MFP 1 with omission of the following steps of the input lack feedback.

At this stage, the instruction to start the voice assistant program has been issued in voice, but a plurality of actions and parameters of the MFP 1 are not specified by the user. Therefore, the management unit 330 (i.e., the execution determination unit 335) determines that the necessary parameters are not met. If any of the necessary conditions is unspecified when the instruction to start the voice assistant program is issued, the management unit 330 (i.e., the execution determination unit 335) similarly determines that the necessary parameters are not met. Therefore, the management unit 330 (i.e., the notification unit 336) generates response information, and transmits the response information to the terminal 2 via the operation voice conversion unit 310 (i.e., the output unit 314) (steps S76 and S77).

The management unit 330 (i.e., the DB management unit 337) manages the communication session with the terminal 2 in the management DB 340. When transmitting the response information to the terminal 2, the management unit 330 (i.e., the notification unit 336) also transmits state information to the terminal 2. Herein, the state information is information indicating that the session is ongoing. When the cloud system 3 transmits an inquiry to the terminal 2 in a subsequent step, the cloud system 3 similarly transmits the state information to the terminal 2 together with the inquiry, although description thereof will be omitted as appropriate.

The response information may include text data, audio data, or image data of the inquiry to the user. In the present example, audio data of a response "Copy or scan?" is transmitted. Thereby, the terminal 2 (i.e., the feedback unit 213) outputs audio feedback with the message "Copy or scan?" (step S78).

The feedback is not limited the above-described message, and may be any message prompting the user to input (i.e., specify) the job type or the job setting condition. Further, the feedback to the user is not limited to the audio output, and may be displayed as text or an image on the touch panel 27 of the terminal 2. In this case, data such as text data or image data (i.e., display information) is transmitted to the terminal 2.

If the user utters a word "Copy" after step S78 or when issuing the instruction to start the voice assistant program, the voice of the user is acquired as audio data by the terminal 2 (i.e., the acquisition unit 211) (step S1-1). The terminal 2 (i.e., the communication control unit 212) transmits the audio data of the utterance "Copy" to the cloud system 3 (step S2-1). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3*b* to S5*b*, the operation voice conversion unit 310 executes the processes to the interpretation of the text data (steps S3-1 to S5-1), and transmits the interpretation result to the management unit 330 (step S6-1). In this step, the action "COPY_EXECUTE" corresponding to the utterance "Copy" is transmitted to the management unit 330 as the interpretation result.

Then, the management unit 330 (i.e., the execution determination unit 335) again executes the necessary parameter fulfillment determination (step S75-1). In the present example, the user has uttered the word "Copy," but the setting values of the necessary parameters such as the number of copies are unknown.

The cloud system 3 therefore inquires of the terminal 2 about the unspecified parameters. Specifically, since the setting values are unspecified at this stage, the management unit 330 (i.e., the notification unit 336) generates response information including a response "Input setting values," and transmits audio data of the response "Input setting values" to the terminal 2 via the operation voice conversion unit 310 (i.e., the output unit 314) (steps S75-1 to S77-1). Then, the terminal 2 (i.e., the feedback unit 213) outputs sound "Input setting values" (step S78-1). In this case, too, the terminal 2 (i.e., the feedback unit 213) may display text "Input setting values" on the touch panel 27, for example, as well as outputting the audio feedback.

Then, in response to the input lack feedback, the user utters a phrase "Double-sided," for example, and the voice of the user is acquired as audio data by the terminal 2 (i.e., the acquisition unit 211) (step S1-2). The terminal 2 (i.e., the communication control unit 212) transmits the audio data of the utterance "Double-sided" to the cloud system 3 (step S2-2). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3*b* to S5*b*, the operation voice conversion unit 310 executes the processes to the interpretation of the text data (steps S3-2 to S5-2), and transmits the interpretation result to the management unit 330 (step S6-2).

In this step, the operation voice conversion unit 310 (i.e., the interpretation unit 313) generates the parameter "PRINT SIDE=DOUBLE-SIDED" as the interpretation result, and transmits the interpretation result to the management unit 330.

Then, the management unit 330 (i.e., the execution determination unit 335) again executes the necessary parameter fulfillment determination (step S75-2). Specifically, the management unit 330 (i.e., the DB management unit 337) stores the interpretation result of the last utterance in the management DB 340, for example, and combines the interpretation result of the last utterance and the interpretation result of the current utterance to complete the action and the parameter. The management unit 330 (i.e., the execution determination unit 335) again executes the necessary parameter fulfillment determination based on the combined interpretation results.

In the above-described example, the management unit 330 combines the interpretation result of the last utterance and the interpretation result of the current utterance. However, the configuration is not limited thereto. For example, the operation voice conversion unit 310 may transmit, to the management unit 330, an interpretation result combining the action "COPY_EXECUTE" in the last utterance and the parameter "PRINT SIDE=DOUBLE-SIDED" in the current utterance.

In the present example, the user has uttered the phrases "Copy" and "Double-sided," but another necessary parameter such as the number of copies is unknown. The management unit 330 (i.e., the execution determination unit 335) therefore determines the lack of a necessary parameter at this stage, too (step S75-2).

The cloud system 3 therefore inquires of the terminal 2 about the unspecified parameter. Steps of inquiring of the terminal 2 about the unspecified parameter is similar to the above-described steps. That is, the management unit 330 (i.e., the notification unit 336) generates response information including a response "How many copies?" and transmits audio data of the response "How many copies?" to the terminal 2 via the operation voice conversion unit 310 (i.e., the output unit 314) (steps S75-2 to S77-2). Then, the terminal 2 (i.e., the feedback unit 213) outputs sound "How many copies?" (step S78-2). In this case, too, the terminal 2 (i.e., the feedback unit 213) may display text "How many copies?" on the touch panel 27, for example, as well as outputting the audio feedback.

Then, in response to the input lack feedback, the user utters a word "Two," for example (step S1-3). Thereafter, similarly as in the foregoing steps, audio data of the utterance is transmitted from the terminal 2 to the cloud system 3, and the necessary parameter fulfillment determination is executed in the cloud system 3. That is, the voice of the user is acquired as audio data by the terminal 2 (i.e., the acquisition unit 211) (step S1-3). The terminal 2 (i.e., the communication control unit 212) transmits the audio data of the utterance "Two" to the cloud system 3 (step S2-3). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3*b* to S5*b*, the operation voice conversion unit 310 executes the processes to the interpretation of the text data (steps S3-3 to S5-3), and transmits the interpretation result to the management unit 330 (step S6-3).

In the present example, the operation voice conversion unit 310 (i.e., the interpretation unit 313) generates the parameter "QUANTITY=2" as the interpretation result, and transmits the interpretation result to the management unit 330.

Then, the management unit 330 (i.e., the execution determination unit 335) again executes the necessary parameter fulfillment determination (step S75-3). Specifically, the management unit 330 (i.e., the DB management unit 337) combines the interpretation result of the last utterance and the interpretation result of the current utterance to complete the action and the parameters. That is, in the present example, the management unit 330 (i.e., the DB management unit 337) completes the action "COPY_EXECUTE" and the parameters "PRINT SIDE=DOUBLE-SIDED, QUANTITY=2." The management unit 330 (i.e., the execution determination unit 335) again executes the necessary parameter fulfillment determination based on the combined interpretation results. In the present example, with the user utterance "Two," the unspecified necessary parameter of the copy job is specified.

In the present example, the management unit 330 (i.e., the notification unit 336) then generates response information including a response "Do you confirm to make two double-sided copies?" for the input confirmation feedback, and transmits audio data of the response "Do you confirm to make two double-sided copies?" to the terminal 2 via the operation voice conversion unit 310 (i.e., the output unit 314) (steps S75-3 to S77-3). Then, the terminal 2 (i.e., the feedback unit 213) outputs sound "Do you confirm to make two double-sided copies?" (step S78-3). In this case, too, the terminal 2 (i.e., the feedback unit 213) may display text "Do you confirm to make two double-sided copies?" on the touch panel 27, for example, as well as outputting the audio feedback. In this step, instead of outputting the text data or the audio data included in the response information, the terminal 2 may generate output information by combining text data items stored in a memory of the terminal 2 based on information included in the response information.

Then, in response to the input confirmation feedback, the user utters an instruction to the terminal 2 to change a setting value or start copying. If the user utters the instruction to change the setting value (step S1-k), audio data of the uttered instruction to change the setting value is transmitted to the cloud system 3 from the terminal 2 (step S2-k). Then, the cloud system 3 changes the setting value, and transmits audio feedback to the terminal 2 to notify that the setting value has been changed (steps S3-k to S77-k). Then, the terminal 2 outputs audio feedback with a message such as "Do you confirm to make copies with setting XXX?" for example, to check with the user whether to start copying with the changed setting value (step S78-k).

Thereafter, if the user again utters the instruction to change the setting value, the above-described sequence is repeated. After the output of the audio feedback "Do you confirm to make two double-sided copies?" therefore, this sequence is repeated k times, i.e., the number of times by which the user utters the instruction to change the setting value.

If the user utters the instruction to start copying with a response "Yes," for example, the n-th sequence illustrated in FIG. 15 takes place. That is, the voice of the user is acquired as audio data by the terminal 2 (i.e., the acquisition unit 211) (step S1-n). The terminal 2 (i.e., the communication control unit 212) transmits the audio data of the utterance "Yes" to the cloud system 3 (step S2-n). In this step, the terminal 2 (i.e., the communication control unit 212) also transmits the device ID of the terminal 2 to the cloud system 3.

In the cloud system 3, the operation voice conversion unit 310 (i.e., the acquisition unit 311) acquires the audio data. Thereafter, similarly as in steps S3b to S5b, the operation voice conversion unit 310 executes the processes to the interpretation of the text data (steps S3-n to S5-n), and transmits the interpretation result to the management unit 330 (step S6-n).

In this step, the operation voice conversion unit 310 (i.e., the interpretation unit 313) recognizes the copy start instruction and transmits the interpretation result to the management unit 330. Then, the management unit 330 (i.e., the execution determination unit 335) determines that the necessary parameters are specified (step S75-n).

Thereby, the management unit 330 (i.e., the interpretation result conversion unit 332) converts the interpretation result into a job execution command to the MFP 1 (step S76). The management unit 330 (i.e., the execution instruction unit 333) then transmits the job execution command obtained through the conversion process to the MFP 1 (step S8). With the voice input operation, therefore, the MFP 1 is controlled to execute copying. The management unit 330 (i.e., the notification unit 336) further generates response information, and transmits the response information to the terminal 2 via the operation voice conversion unit 310 (i.e., the output unit 314) (steps S76-n and S77-n). Then, the terminal 2 (i.e., the feedback unit 213) outputs audio feedback "Job will be started" (step S78-n).

The above-described state information represents the state of the session. For example, if the job execution command to the MFP 1 is not transmitted yet and the user is performing the job setting process, state information indicating the continuation of the session is transmitted. If the transmission of the job execution command to the MFP 1 is completed, state information indicating the completion of the session is transmitted.

However, the state information is not limited thereto, and may be more detailed information of the session state. The operation voice conversion unit 310 or the management unit 330 determines whether to continue or complete the session in accordance with the state information. That is, if the user specifies the job setting conditions with a plurality of utterances, and if the state information indicates that the session is ongoing, the operation voice conversion unit 310 or the management unit 330 determines that the job setting conditions belong to one job. If the state information indicates that the session is completed, the operation voice conversion unit 310 or the management unit 330 determines that the job setting condition included in the next user utterance belongs to a new job. Even if the instruction concerning the job type and the job setting conditions is issued with a plurality of utterances, therefore, the operation voice conversion unit 310 or the management unit 330 is capable of determining whether the job type and the job setting conditions belong to the same job or different jobs.

If no signal is received from the terminal 2 for at least a predetermined time, the management unit 330 may determine that the session is completed. The communication target (i.e., the MFP 1) may execute the job regardless of the continuation or discontinuation of the session. In this case, the MFP 1 as the communication target acquires the job execution command, and overwrites the job conditions currently held in the MFP 1 with the job conditions included in the acquired job execution command. In this process, all job conditions held in the MFP 1 may be deleted or reset to default conditions to set the job conditions included in the job execution command.

Alternatively, if one of the job conditions held in the MFP 1 is inconsistent with the corresponding one of the job conditions included in the job execution command, the job condition held in the MFP 1 may be overwritten with the corresponding job condition in the job execution command, which is given priority. If one of the job conditions held in the MFP 1 is consistent with the corresponding one of the job conditions included in the job execution command, the job condition held in the MFP 1 may be maintained. After the job is executed, the MFP 1 may delete the job conditions included in the job execution command to reset the job conditions of the MFP 1 to the default conditions previously registered in the MFP 1.

An example of information fed back from the cloud system 3 will be described.

In the above-described example, the feedback unit 213 of the terminal 2 outputs the text data or the audio data included in the response information. However, the output information is not limited thereto. The feedback unit 213 may read all or parts of text data stored in a memory of the terminal 2 based on information included in the response information, and may generate the output information by combining the read parts of the text data. TABLE 2 given below illustrates an example of the response information and feedback transmitted to the terminal 2 from the cloud system 3.

TABLE 2

| Name | Value | Processing of application |
| --- | --- | --- |
| Action | COPY_PARAMETER_SETTING | Prompt user to input job setting value |
|  | COPY_CONFIRM | Prompt user to confirm job setting value |
|  | COPY_EXECUTE | Execute copy job |
| Parameter | Print side | Change setting value of print side |
|  | Quantity | Change setting value of quantity |
|  | *Other parameters specifiable as job setting values | |
| Response | Text | Feed back contents specified in text to user |

As illustrated in TABLE 2, an action such as "COPY_PARAMETER_SETTING" for prompting the user to input the job setting value or "COPY_CONFIRM" for prompting the user to confirm the job setting value, for example, is included in the response information and fed back to the terminal 2 from the cloud system 3.

The feedback unit 213 determines the feedback to be output to the user in accordance with the action, parameters, and response included in the response information. Information as in TABLE 2 may be stored in a memory of the terminal 2 such that the feedback unit 213 refers to the stored information to determine the contents of the feedback. Although TABLE 2 illustrates examples of the response information of the copy job, "PARAMETER_SETTING" for prompting the user to input the job setting value and "CONFIRM" for prompting the user to confirm the job setting value may also be used as the action in the response information of the print, scan, or FAX job similarly as in TABLE 2. The response information may include at least one of the action and parameter and the response.

Further, for example, the setting value of the print side such as single-sided or double-sided or the parameter such as the number of copies is included in the response information and fed back to the terminal 2. Further, if there is an unspecified necessary parameter, a message for prompting the user to input (i.e., specify) the unspecified necessary parameter is included in the response information as the response and fed back to the terminal 2.

Reflection of the user instruction on a setting screen of the MFP 1 will be described.

The foregoing description has been given of a sequence of steps in which the user inputs a voice instruction to the terminal 2 and the cloud system 3 interprets the voice instruction and instructs the MFP 1 to execute processing based on the interpretation result. In this case, after instructing the MFP 1 to execute processing, the cloud system 3 generates and transmits the audio feedback (e.g., audio feedback with a message "Process executed") to the terminal 2 irrespective of the processing result, i.e., regardless of whether the processing has actually been performed in the MFP 1. Herein, the processing result is not transmitted to the cloud system 3 from the MFP 1 with the latency or communication cost taken into account.

If there arises a difference between the actual state of the MFP 1 and the state of the MFP 1 understood by the cloud system 3, therefore, feedback with false information may be output. In this case, the result of the user instruction is not obtained by the MFP 1, but the user is unable to immediately understand the situation by checking the MFP 1.

The following description will be given of a configuration of the voice operation system 100 enabling the user to check the processing result of the operation requested to the terminal 2 by the user.

Figure 16:
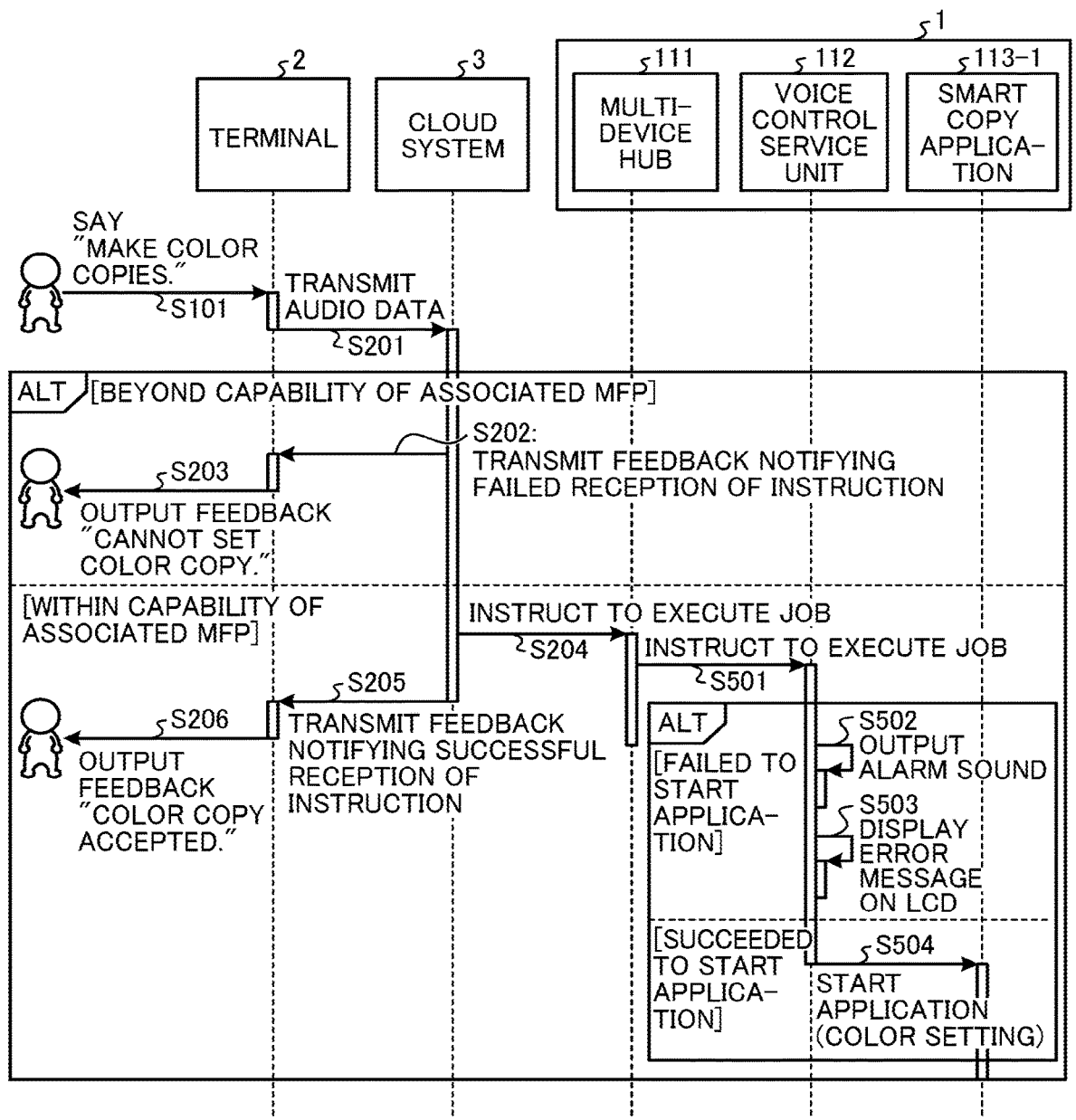
FIGS. 16 and 17 are sequence diagrams illustrating an example of an overall operation of the voice operation system of the embodiment to enable a user to check a processing result of an operation requested to the terminal.
Figure 17:
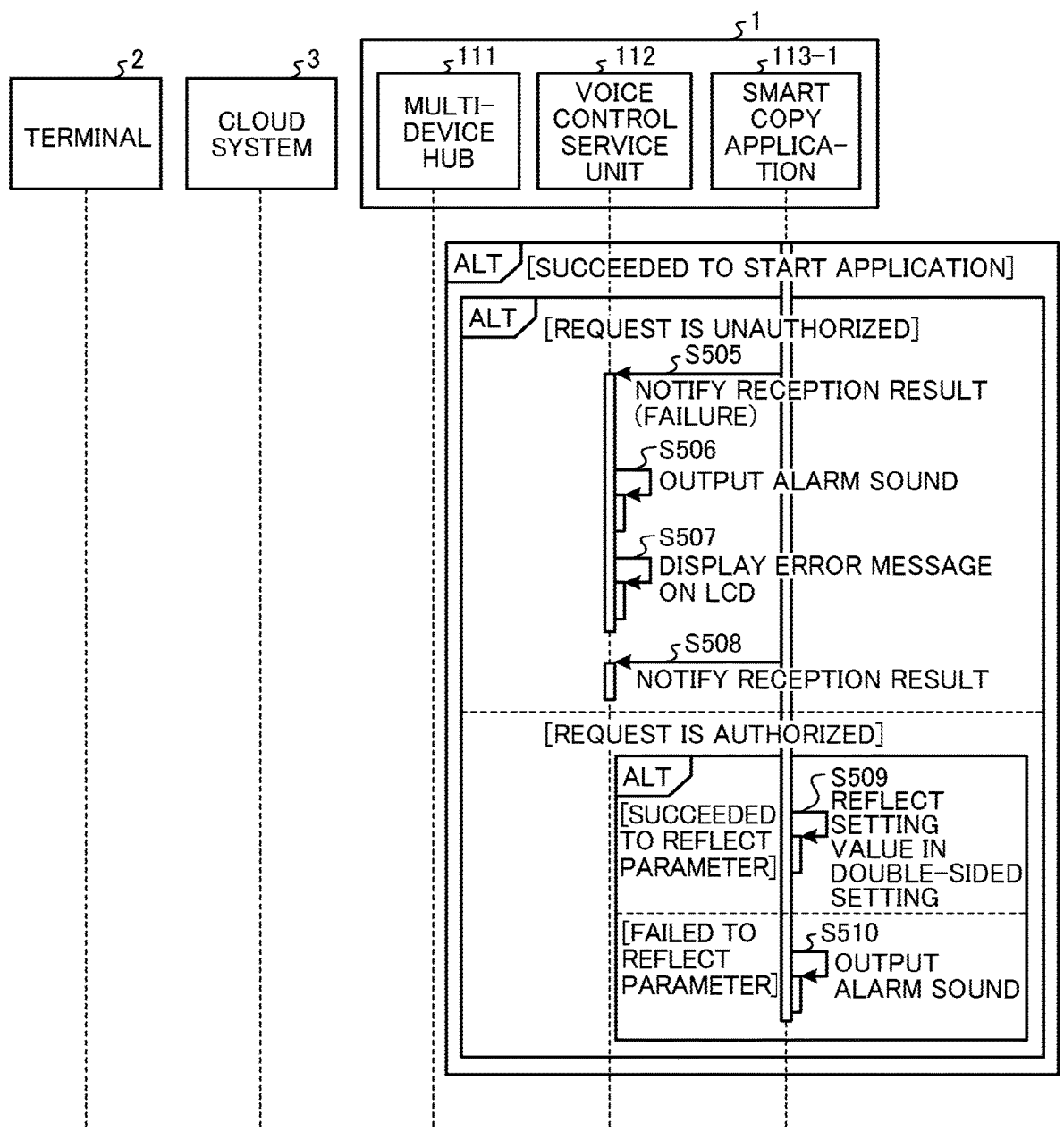

FIGS. 16 and 17 are sequence diagrams illustrating an example of an overall operation of the voice operation system 100 to enable the user to check the processing result of the operation requested to the terminal 2 by the user.

If the user utters a phrase "Make color copies," for example, the voice of the user is acquired as audio data by the terminal 2 (i.e., the acquisition unit 211), as illustrated in FIG. 16 (step S101). The terminal 2 (i.e., the communication control unit 212) transmits the audio data of the utterance "Make color copies" to the cloud system 3 (step S201).

In response to the transmitted audio data of the utterance "Make color copies," the cloud system 3 determines that the MFP 1 to be controlled (i.e., a control target) is incapable of making color copies, i.e., that making color copies is beyond the capability of the control target. Then, the cloud system 3 feeds back to the terminal 2 audio data with a message notifying failed reception of the user instruction, such as a message "Cannot set color copy" in the present example (step S202). Thereby, the terminal 2 outputs audio feedback with the message "Cannot set color copy" (step S203).

The process of the cloud system 3 to determine the user instruction as inexecutable in the MFP 1 (i.e., beyond the capability of the control target) will be described. In the following description, parts of the process already described above will be briefly described.

With the operation voice conversion unit 310, the cloud system 3 converts the audio data transmitted from the terminal 2 into text data, and interprets the text data based on the dictionary information. In the present example, the user has uttered the phrase "Make color copies." Therefore, the operation voice conversion unit 310 (i.e., the interpretation unit 313) transmits the action "COPY" and the parameter "COLOR=COLOR" to the management unit 330 as the interpretation result. The management unit 330 (i.e., the execution determination unit 335) compares the interpretation result with the processing capability (hereinafter referred to as the capability information) of the MFP 1 as the control target, to thereby determine whether the job specified by the user is executable in the MFP 1 as the control target. The capability information of the MFP 1 as the control target is previously acquired. The capability information includes configuration information of the MFP 1 and information of the types of jobs executable in the MFP 1. For example, the process of step S202 in FIG. 16 is executed when the management unit 330 (i.e., the execution determination unit 335) determines that the MFP 1 as the control target is a monochrome copier and thus is incapable of executing the user instruction (i.e., color copy). The management unit 330 (i.e., the notification unit 336) transmits response information including a response "Cannot set color copy" to the terminal 2 via the operation voice conversion unit 310 (i.e., the output unit 314).

The cloud system 3 thus stores the capability information of the MFP 1, which is infrequently changed. If the cloud system 3 is capable of determining the failed reception of the user instruction based on the stored capability information, therefore, the cloud system 3 transmits to the terminal 2 feedback notifying the failed reception of the user instruction, without instructing the MFP 1 to execute the job.

If the MFP 1 as the control target is a color copier, on the other hand, the cloud system 3 determines that the user instruction is in executable in the MFP 1 as the control target (i.e., within the capability of the control target). In this case, the cloud system 3 instructs the MFP 1 as the control target to execute the job (step S204). Specifically, in the cloud system 3, the management unit 330 (i.e., the interpretation result conversion unit 332) converts the interpretation result into a job execution command (i.e., operation request) compatible with the MFP 1 as the control target. Then, the management unit 330 (i.e., the execution instruction unit 333) transmits the job execution command to the MFP 1, to thereby instruct the MFP 1 to execute the job.

Further, in this case, the cloud system 3 feeds back to the terminal 2 audio data with a message notifying successful reception of the user instruction, such as a message "Color copy accepted" in the present example (step S205). In this feedback, the management unit 330 (i.e., the notification unit 336) transmits response information including a response "Color copy accepted" to the terminal 2 via the operation voice conversion unit 310 (i.e., the output unit 314). Thereby, the terminal 2 outputs audio feedback with the message "Color copy accepted" (step S206).

In the MFP 1 as the control target, the multi-device hub 111 receives the job execution command (i.e., operation request) transmitted from the cloud system 3. Then, the voice control service unit 112 receives the job execution command (step S501), interprets the job execution command, and attempts to start the target application to reflect the specified setting value in the settings.

If the voice control service unit 112 determines a failed condition, the voice control service unit 112 outputs alarm sound from the MFP 1 to notify the user that the job execution in the MFP 1 has failed (step S502). The failed condition may be related to unavailability to start the application as in a situation in which authorization to use the application or execute the job is not set for a logged-in user or another application is being started up, for example. The failed condition may also be related to a failure to normally execute the processing due to a system bug, shortage of a consumable such as toner or paper, or another error such as paper jam, for example.

The alarm sound is illustrative, and may be replaced by any other alarm means for notifying the user of the failure to execute the job in the MFP 1. For example, other than the sound, light emitted from a light emitting diode (LED) may be used for alarming.

Further, in the present example, as well as outputting the alarm sound, the voice control service unit 112 displays an error message (e.g., a message notifying the failure to start the application) on the LCD of the operation device 16 of the MFP 1 (step S503). This process of displaying the error message, however, may be omitted. As described in detail later, a screen on the LCD of the operation device 16 of the MFP 1 reflects (i.e., displays) successfully processed settings. By checking the settings displayed on the screen, therefore, the user is able to know which instruction is yet to be executed.

In the present example, application availability determination is executed to determine whether it is possible to start the target application, although detailed description thereof will be omitted here. In the following description, it is assumed possible to start the application based on the application availability determination.

A description will first be given of an operation performed when the target application is started but unable to reflect the specified setting value in the settings.

The voice control service unit 112 first attempts to start the target application to reflect the setting value in the settings, and successfully starts the target application (i.e., the smart copy application 113-1 in the present example) (step S504).

The smart copy application 113-1 attempts to set the parameter (i.e., color copy in this example). If the received request is unauthorized, the smart copy application 113-1 notifies the voice control service unit 112 of a failure to receive the requested process (step S505).

In response to the notification of the failure from the smart copy application 113-1, the voice control service unit 112 outputs the alarm sound from the MFP 1, to thereby notify the user that the MFP 1 has failed to execute the job (step S506).

In the present example, as well as outputting the alarm sound, the voice control service unit 112 displays an error message (e.g., a message notifying the failure to set the parameter) on the LCD of the operation device 16 of the MFP 1 (step S507). This process of displaying the error message, however, may be omitted.

Thereafter, the smart copy application 113-1 again attempts to set the requested parameter (i.e., color copy), and notifies the voice control service unit 112 of the result of the attempt to receive the process (step S508).

If the received request is authorized, on the other hand, the smart copy application 113-1 reflects the received parameter (i.e., color copy) in the settings (step S509). For example, the smart copy application 113-1 reflects the setting value of color copy in the setting of double-sided copy.

If the smart copy application 113-1 fails to reflect the received parameter in the settings, the smart copy application 113-1 outputs the alarm sound from the MFP 1, to thereby notify the user of the failure to set the parameter (step S510).

The smart copy application 113-1 is an application started in response to a copying operation performed on the operation device 16 of the MFP 1 to display a UI screen on the operation device 16 and perform the copying process based on settings displayed on the UI screen. When the user issues a voice instruction, therefore, the settings based on the voice instruction are reflected and displayed on the screen of the operation device 16 of the MFP 1, similarly as in the case in which the setting of the MFP 1 is performed with the operation device 16. That is, the screen of the operation device 16 of the MFP 1 displays successfully processed settings. For example, when the terminal 2 receives a voice instruction (i.e., user request) during the reflection of a previous voice instruction (i.e., user request) by the terminal 2, the screen of the operation device 16 displays the job type and settings reflecting each processed voice instruction. By checking the settings displayed on the screen, therefore, the user is able to know which one of the instructions is yet to be executed.

After the voice instruction is issued and the screen of the operation device 16 displays the settings reflecting the voice instruction, the operation device 16 of the MFP 1 is capable of receiving a touch input operation performed by the user. That is, after the reflection of the job, the operation device 16 of the MFP 1 is capable of receiving a change in the job settings of the reflected job. After issuing the voice instruction, therefore, the user is able to perform an operation such as setting or execution of the job by operating the operation device 16 of the MFP 1.

The above-described process is executed by the voice control service unit 112 and the application started depending on the job type (e.g., the smart copy application 113-1, the smart scan application 113-2, or the smart FAX application 113-3), which are implemented by the CPU 10 of the MFP 1.

A description will now be given of an operation to process a plurality of voice instructions received in sequence. When a plurality of voice instructions are issued in sequence, it may take time for the MFP 1 to reflect the first instruction in the settings, and the MFP 1 may receive the second instruction (i.e., job execution command) during the reflection of the first instruction by the MFP 1. In this case, the voice operation system 100 temporarily queues the second instruction in a memory such as the HDD 13 of the MFP 1, for example, instead of rejecting the second instruction. Then, after completing the reflection of the first instruction, the voice operation system 100 starts reflecting the second instruction in the settings, thereby sequentially processing the voice instructions received in sequence.

A description will be given of an example in which the first instruction involves history retrieval in the cloud system 3, which extends the processing time of the cloud system 3, resulting in the reception of the second instruction (i.e., job execution command) during the reflection of the first instruction in the settings by the MFP 1. The history retrieval is illustrative, and may be replaced by any other process that extends the processing time of the cloud system 3.

Figure 18:
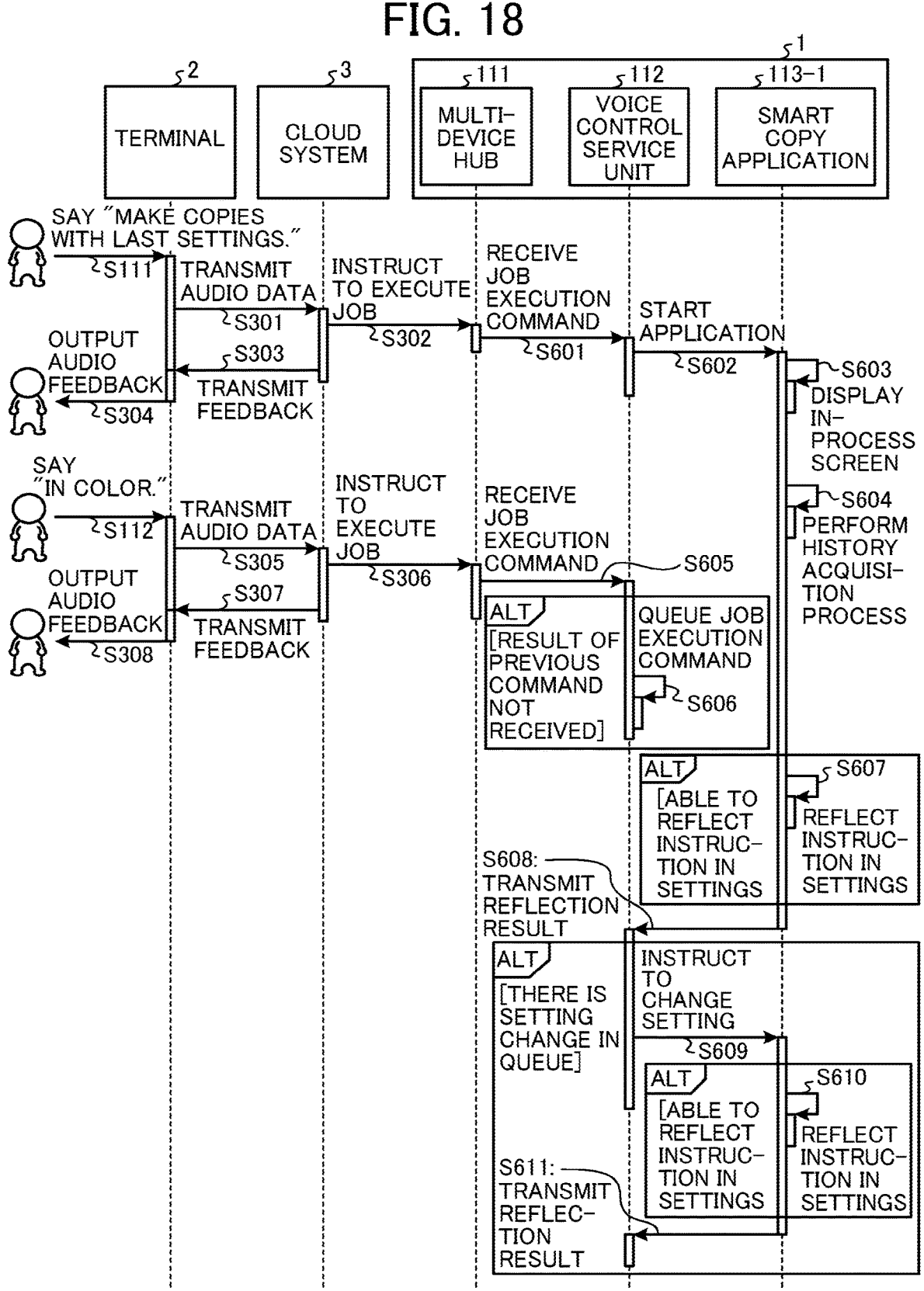
FIG. 18 is a sequence diagram illustrating an example of an overall operation of the voice operation system of the embodiment to process a plurality of voice instructions received in sequence.

FIG. 18 is a diagram illustrating an example of an overall operation of the voice operation system 100 to process a plurality of voice instructions received in sequence. The following description will focus on the queueing performed when a plurality of voice instructions are received in sequence. The operation of the voice operation system 100 in this case involves processes similar to those described above with FIGS. 16 and 17, such as the feedback by the cloud system 3 when the user instruction is inexecutable in the MFP 1 and the notification by the MFP 1 when the start of the application or the setting fails in the MFP 1. Illustration and description of such processes are redundant, and thus will be omitted here. It should be understood, however, that the operation illustrated in FIG. 18 actually includes processes similar to those described above with FIGS. 16 and 17.

For example, as illustrated in FIG. 18, when the user says "Make copies with the last settings" to the terminal 2 as the first instruction, the voice of the user is acquired as audio data by the terminal 2 (i.e., the acquisition unit 211) (step S111). Then, the terminal 2 (i.e., the communication control unit 212) transmits the audio data of the utterance "Make copies with the last settings" to the cloud system 3 (step S301).

The cloud system 3 interprets the instruction based on the transmitted audio data of the utterance "Make copies with the last settings," and instructs the MFP 1 as the control target to execute the job (step S302). The cloud system 3 further transmits to the terminal 2 audio data with a message "Copy with settings ZZZ accepted. Any change in settings?" (step S303). Thereby, the terminal 2 outputs audio feedback with the message "Copy with settings ZZZ accepted. Any change in settings?" (step S304).

In the present example, the user has issued the instruction "Make copies with the last settings." The processing of the cloud system 3 therefore involves a process of searching through a memory (e.g., the HDD 13) for the settings of the last instruction and acquiring the settings. The cloud system 3 is capable of holding the contents of a voice instruction in the memory as history information. In the present example, in response to the instruction "Make copies with the last settings," the cloud system 3 searches through the memory for the history information, and acquires the instruction in the last history. In the message "Copy with settings ZZZ accepted," the part "ZZZ" includes a specific instruction in the last history acquired from the history information by the cloud system 3. It is assumed in the present example that "ZZZ" includes "three monochrome copies."

In the MFP 1 as the control target, the multi-device hub 111 receives the job execution command (i.e., operation request) transmitted from the cloud system 3. Then, the voice control service unit 112 receives the job execution command (step S601), interprets the job execution command, and attempts to start the target application to reflect the setting values (i.e., three monochrome copies) of the last history in the settings (step S602).

The target application (i.e., the smart copy application 113-1 in the present example) displays, on the screen of the operation device 16, an in-progress screen indicating that the MFP 1 is processing the instruction, to thereby block the reception of the touch input operation (step S603).

After the start of the smart copy application 113-1, the smart copy application 113-1 executes a process of acquiring the parameters (i.e., three monochrome copies) (step S604).

The terminal 2 outputs feedback "Copy with settings 'three monochrome copies' accepted. Any change in settings?" in response to the first instruction. If the user then utters a phrase "In color," for example, as the second instruction, the voice of the user is acquired as audio data by the terminal 2 (i.e., the acquisition unit 211) similarly as in the processing of the first instruction (step S112). Then, the terminal 2 (i.e., the communication control unit 212) transmits the audio data of the utterance "In color" to the cloud system 3 (step S305).

The cloud system 3 interprets the instruction based on the transmitted audio data of the utterance "In color," and instructs the MFP 1 as the control target to execute the job, i.e., change the settings (step S306). The cloud system 3 further transmits to the terminal 2 audio data with a message "Copy with settings 'three color copies' accepted. Any other change in settings?" (step S307). Thereby, the terminal 2 outputs audio feedback with the message "Copy with settings 'three color copies' accepted. Any other change in settings?" (step S308).

In the MFP 1 as the control target, the multi-device hub 111 receives the job execution command (i.e., operation request) transmitted from the cloud system 3. Then, the voice control service unit 112 receives and interprets the job execution command (step S605). In this step, the voice control service unit 112 has not received the result of the previous job execution command from the target application (i.e., the smart copy application 113-1 in the present example). The voice control service unit 112 therefore queues the newly received job execution command (step S606). If another new job execution command is received thereafter, the voice control service unit 112 performs the queueing process of step S606 for the new job execution command in order of receipt.

The target application (i.e., the smart copy application 113-1) reflects the first instruction in the settings (step S607), and transmits the reflection result of to the voice control service unit 112 (steps S608). Then, the voice control service unit 112 instructs the target application (i.e., the smart copy application 113-1) to process one of the queued job execution commands in order of queueing (i.e., in order of receipt). In the present example, the voice control service unit 112 instructs the smart copy application 113-1 to execute a change in the settings to "color" in accordance with the second instruction (step S609).

The target application (i.e., the smart copy application 113-1) reflects the second instruction in the settings (step S610), and transmits the reflection result to the voice control service unit 112 (steps S611). Then, the voice control service unit 112 repeats the above-described process for each job execution command remaining in the queue to instruct the target application (i.e., the smart copy application 113-1) to execute the job execution command.

As described above, when a plurality of voice instructions are received in sequence, the voice instructions are queued in the MFP 1, and operations such as setting and changing the setting are executed in order of queueing. After the voice instructions received in sequence are all processed, the display of the in-progress screen is cancelled, and the final updated settings are displayed on the screen. By checking the screen of the MFP 1, therefore, the user is able to make a final check of the settings based on the voice instructions. If a further change in the settings is necessary, the user may perform the touch input operation by directly touching the screen of the MFP 1 to change the settings. Then, the user presses a start button (i.e., execution button) of the MFP 1, and the MFP 1 outputs copies with the final settings.

In the above-described example, the display of the in-progress screen is cancelled after the voice instructions received in sequence are all processed, specifically after all voice instructions are successfully reflected in the settings. As described above with FIGS. 16 and 17, the processing of the voice instructions may involve a process such as the feedback by the cloud system 3 when the instruction is inexecutable in the MFP 1 or the notification by the MFP 1 when the start of the application or the setting fails in the MFP 1. Therefore, the display of the in-progress screen is cancelled each time one job execution command succeeds or fails to be reflected in the settings (e.g., each time the target application transmits the reflection result to the voice control service unit 112), and the in-progress screen is displayed while the target application is performing the reflection process. If the reflection process fails to complete, therefore, the screen of the MFP 1 displays settings successfully reflecting the instruction such that the user may then perform the touch input operation on the screen.

In the present embodiment, the voice control service unit 112 executes the queueing. Alternatively, the target application may execute the queueing.

When the MFP 1 receives the second instruction during the reflection of the first instruction, the MFP 1 starts the reflection of the second instruction immediately after the first instruction is reflected on the screen of the LCD of the operation device 16 of the MFP 1, consequently reflecting the processing results of the first and second instructions on the screen of the LCD. Depending on the contents of the first instruction, however, the MFP 1 may execute the second instruction even if the reflection of the first instruction fails, thereby displaying on the screen of the LCD the reflection result of the second instruction but not the reflection result of the first instruction. For example, if the first instruction involves the use of history data but the corresponding history data is absent, the first instruction fails. In this case, the screen of the LCD may display the reflection result of the second instruction but not the reflection result of the first instruction.

If the second instruction fails, the screen of the LCD displays the reflection result of the first instruction but not the reflection result of the second instruction. For example, if the user is authorized to make monochrome copies but unauthorized to make color copies in the example of FIG. 18, the first instruction to make monochrome copies is reflected in the settings, since the user is authorized to make monochrome copies. However, a change in the settings based on the second instruction to make color copies is not executed.

When the first instruction becomes ready to be reflected in the settings, the application transmits the reflection result to the voice control service unit 112, and checks if there is any instruction in queue. If there is an instruction in queue, the application continues to display the in-progress screen without reflecting the first instruction on the screen of the LCD. Then, after confirming that there is no instruction in queue, the application reflects the first instruction on the screen of the LCD.

The voice instruction is not successfully processed if performed during the display of the in-progress screen, such as during the history search in response to the user operation. During the display of the in-progress screen, such as during the history search in response to the voice instruction, therefore, the voice operation system 100 does not receive the user instruction.

As understood from the foregoing description, in the voice operation system 100 of the embodiment, the terminal 2 is installed with the operation processing program as a platform application program, which communicates with the cloud system 3. When the user speaks to the microphone 29 of the terminal 2, the cloud system 3 analyzes the contents of the user utterance, and operates the MFP 1 to perform the operation specified by the user. That is, the voice input operation is performed.

Thereby, a command for a complicated operation is issued in voice, obviating the need for an operation with a graphical user interface (GUI) on the touch panel 27, for example. This configuration therefore makes the input operation faster and easier even for a user experienced with the operation. Further, the interactive operation support enables a senior or inexperienced user to perform a desired operation faster and with more ease when performing complicated network setting or advanced job setting or when installing a new application program, for example.

Further, since the intention of the user is analyzed based on the text of the user utterance, the process based on the user utterance is determined by the cloud system 3.

Further, with the feedback from the cloud system 3, the alarm sound from the MFP 1, or the operation screen of the MFP 1, the user is able to check whether the MFP 1 is executing the process based on the voice instruction input to the terminal 2 by the user. When the process based on the voice instruction input to the terminal 2 by the user fails to complete, therefore, the user is able to immediately know the failure. That is, when the user issues a plurality of voice instructions, the user is able to know which part of the voice instructions has been reflected in the MFP 1.

Further, if the user operates the screen on the operation device 16 of the MFP 1 to display the latest history and make a change in the settings based on the displayed history (e.g., a change from monochrome to color), the user operation is blocked until the latest history is displayed on the screen, consequently extending the time in which the user operation is blocked. The voice operation, on the other hand, does not involve the operation on the screen. With the voice operation, therefore, it is possible to queue the setting change instruction and start the process of changing the settings immediately after the latest history is reflected.

Further, when a voice instruction is received by the MFP 1 during the processing of a previous voice instruction in the MFP 1 due to delayed processing of the previous voice instruction, the queueing enables the subsequent voice instruction to be sequentially processed and reflected, without being skipped.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more circuits or circuitry. Circuitry includes a programmed processor, as a processor includes circuitry. A circuitry also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus, comprising:
   circuitry configured to
      receive, via a communication network, a first user request input in voice to a terminal,
      when the first user request is recognized and understood, perform a process of reflecting the first user request in a type or setting of a job and immediately after the process of reflecting the first user request is started, display an in-progress screen indicating that the first user request is being processed but is not yet completed,
      when the process of reflecting the first user request is successful, display, on a display, information of the type or setting of the job reflecting the first user request,
      when the received first user request is recognized and understood, but fails to be reflected in the type or setting of the job, output information notifying the failure to reflect the received first user request in the type or setting of the job, and
      when a second user request, input in voice to the terminal after the first user request, is received via the communication network before the process of reflecting the first user request is completed and while the in-progress screen is displayed,
      temporarily store the second user request in a memory until the process of reflecting the first user request is completed and the information of the type or the setting of the job reflecting the first user request is displayed on the display,
      display, on the display, information of the type or setting of the job reflecting a previous user request preceding the second user request, the previous user request including the first user request so that all successful user requests are each reflected in the information displayed on the display, and
      while continuing to display the in-progress screen, perform a process of reflecting the second user request after the process of reflecting the first user request is completed and the information of the type or the setting of the job reflecting the first user request is displayed on the display,
   wherein the circuitry is further configured to continue to display the in-progress screen only until the process of reflecting the second user request is also completed.

2. The information processing apparatus of claim 1, further comprising an alarm device, and
   wherein the circuitry is further configured to control the alarm device to output the information notifying the failure to reflect the first user request in the type or setting of the job.

3. The information processing apparatus of claim 1, wherein the circuitry is further configured to receive a change in the job after the first user request is reflected in the type or setting of the job.

4. The information processing apparatus of claim 1, wherein when the process of reflecting the first user request fails and the process of reflecting the second user request succeeds, the circuitry is further configured to display a result of the process of reflecting the second user request on the display.

5. The information processing apparatus of claim 1, wherein the circuitry is further configured to determine that the received first user request fails to be reflected in the type or setting of the job when the first user request is recognized and understood, but is not authorized or cannot be performed.

6. The information processing apparatus of claim 1, further comprising an operation device enabling manual input from a user,
   wherein, when the in-progress screen is displayed, the circuitry is further configured to block manual input to the operation device.

7. An information processing system, comprising:
   at least one server; and
   at least one information processing apparatus connectable with the at least one server via a communication network,
   the at least one server including first circuitry configured to
      acquire audio information of voice input to a terminal, and
      transmit a first user request to the at least one information processing apparatus based on the acquired audio information, and
   the at least one information processing apparatus including second circuitry configured to
      when the first user request is recognized and understood, perform a process of reflecting the first user request in a type or setting of a job and immediately after the process of reflecting the first user request is started, display an in-progress screen indicating that the first user request is being processed but is not yet completed,
      when the process of reflecting the first user request is successful, display, on a display, information of the type or setting of the job reflecting the first user request,
      when the received first user request is recognized and understood, but fails to be reflected in the type or setting of the job, output information notifying the failure to reflect the received first user request in the type or setting of the job, and when a second user request, input in voice to the terminal after the first user request, is received via the communication network before the process of reflecting the first user request is completed and while the in-progress screen is displayed, temporarily store the second user request in a memory until the process of reflecting the first user request is completed and the information of the type or the setting of the job reflecting the first user request is displayed on the display, display, on the display, information of the type or setting of the job reflecting a previous user request preceding the second user request, the previous user request including the first user request so that all successful user requests are each reflected in the information displayed on the display, and while continuing to display the in-progress screen, perform a process of reflecting the second user request after the process of reflecting the first user request is completed and the information of the type or the setting of the job reflecting the first user request is displayed on the display, wherein the second circuitry is further configured to continue to display the in-progress screen only until the process of reflecting the second user request is also completed.

8. The information processing system of claim 7, wherein the first circuitry of the at least one server is further configured to determine whether the first user request is executable in the at least one information processing apparatus, and wherein when it is determined that the first user request is inexecutable in the at least one information processing apparatus, the first circuitry of the at least one server is further configured to transmit, to the terminal, information notifying that the first user request is inexecutable in the at least one information processing apparatus, without transmitting the first user request to the at least one information processing apparatus.

9. The information processing system of claim 8, wherein the first circuitry of the at least one server is further configured to acquire audio information of voice input to a terminal,
convert the acquired audio information into text information,
interpret the first user request based on the text information,
transmit the first user request to the at least one information processing apparatus, and
transmit audio information to the terminal in accordance with the first user request.

10. An information processing method, comprising:
receiving, via a communication network, a first user request input in voice to a terminal;

when the first user request is recognized and understood, performing a process of reflecting the first user request in a type or setting of a job and immediately after the process of reflecting the first user request is started, displaying an in-progress screen indicating that the first user request is being processed but is not yet completed;

when the process of reflecting the first user request is successful, displaying, on a display, information or the type of setting of the job reflecting the first user request;

when the received first user request is recognized and understood, but fails to be reflected in the type or setting of the job, outputting information notifying the failure to reflect the received first user request in the type or setting of the job;

when a second user request, input in voice to the terminal after the first user request, is received via the communication network before the process of reflecting the first user request is completed and while the in-progress screen is displayed, temporarily storing the second user request in a memory until the process of reflecting the first user request is completed and the information of the type or the setting of the job reflecting the first user request is displayed on the display, displaying, on the display, information of the type or setting of the job reflecting a previous user request preceding the second user request, the previous user request including the first user request so that all successful user requests are each reflected in the information displayed on the display, and while continuing to display the in-progress screen, performing a process of reflecting the second user request after the process of reflecting the first user request is completed and the information of the type or the setting of the job reflecting the first user request is displayed on the display, and continuing to display the in-progress screen only until the process of reflecting the second user request is also completed.

11. The information processing method of claim 10, further comprising:
using an alarm device, outputting the information notifying the failure to reflect the first user request in the type or setting of the job.

12. The information processing method of claim 10, further comprising:
receiving a change in the job after the first user request is reflected in the type or setting of the job.

13. The information processing method of claim 10, further comprising:
when the process of reflecting the first user request fails, and the process of reflecting the second user request succeeds, displaying a result of the process of reflecting the second user request on the display.

* * * * *